US006343802B1

(12) United States Patent
Workman et al.

(10) Patent No.: US 6,343,802 B1
(45) Date of Patent: Feb. 5, 2002

(54) METHOD AND SYSTEM FOR CONCENTRATED PRIMARY SUPPORT FOR A USER IN SUPPORT ASSISTIVE DEVICES

(75) Inventors: Jonathan P. Workman, Loveland; Kenneth W. House; Donald H. Eason, both of Fort Collins, all of CO (US)

(73) Assignee: Ultimate Support Systems, Inc., Fort Collins, CO (US)

( * ) Notice: Subject to any disclaimer, the term of this patent is extended or adjusted under 35 U.S.C. 154(b) by 0 days.

(21) Appl. No.: 09/091,388

(22) PCT Filed: Dec. 12, 1996

(86) PCT No.: PCT/US96/20698

§ 371 Date: Jun. 12, 1998

§ 102(e) Date: Jun. 12, 1998

(87) PCT Pub. No.: WO97/21413

PCT Pub. Date: Jun. 19, 1997

Related U.S. Application Data

(60) Provisional application No. 60/008,649, filed on Dec. 14, 1995.

(51) Int. Cl.[7] .............................. B62M 1/00; A61H 3/04

(52) U.S. Cl. .............................. 280/87.041; 280/87.05; 135/67; 482/68

(58) Field of Search .......................... 280/87.05, 87.051, 280/87.041, 651, 655.1, 87.021, 648, 42; 482/66, 68, 69, 24; 135/67; 297/5, 6

(56) References Cited

U.S. PATENT DOCUMENTS

| | | | | |
|---|---|---|---|---|
| 1,307,058 A | | 6/1919 | McGrath | |
| 2,327,671 A | | 8/1943 | Rupprecht | 272/70 |
| 2,369,040 A | | 2/1945 | Grady | 155/22 |
| 2,459,066 A | | 1/1949 | Duke | 195/32 |
| 2,654,416 A | | 10/1953 | Maniscalco | 155/34 |
| 3,165,314 A | * | 1/1965 | Clearman et al. | 280/87.05 |
| 3,488,088 A | | 1/1970 | Goldberg et al. | 297/5 |

(List continued on next page.)

OTHER PUBLICATIONS

"The Mery Walker™," flyer.

"Lite Gait," Mobility Research, PT Today, Aug. 21, 1995, p. 9.

"Merry Walker," PT Today, Aug. 21, 1995, p. 11.

(List continued on next page.)

*Primary Examiner*—Lanna Mai
*Assistant Examiner*—Jeffrey J. Restifo
(74) *Attorney, Agent, or Firm*—Santangelo Law Offices, P.C.

(57) ABSTRACT

A support assistive device for a user having a frame assembly, a vertical pelvis support element connected to the frame assembly which may primarily support the user in the ischial tuberosity region, and a horizontal pelvis support element which may primarily support the anterior superior iliac spine region of a pelvis. It may provide such support with minimal or no hand or arm support. By supporting on the anterior superior iliac spine on either side, a moment can be created to assist in turning even without the use of hands by simply turning the direction of the pelvis. The created moment of the present invention is more natural to the user in turning the pelvis and as a result the device. Additionally, a fluidic braking assembly for any rotatable elements is provided, which can be advantaged to assist a user in supplying an increase of force to actuate the braking action. The braking system may be actuated from a single station or multiple stations and may provide braking in any direction the wheels are turned, that is, omni-directionally. It may also include a elevation assembly that can assist lowering of an upper frame assembly to a corresponding elevation with a lower frame assembly to assist in packaging and in transportation. It may also provide a rotatable swivel lock system for the rotatable elements that may be restrained in various orientations, and may be controlled through a single station.

47 Claims, 16 Drawing Sheets

U.S. PATENT DOCUMENTS 3,778,052 A * 12/1973 Andow et al. ........... 280/87.05
4,068,857 A * 1/1978 Karlsson ..................... 280/259
4,165,127 A 8/1979 Vago .......................... 297/345
4,188,966 A 2/1980 Palmer et al. ................ 135/67
4,189,164 A 2/1980 Moorer ...................... 280/87.5
4,211,426 A * 7/1980 Motloch ................ 280/87.021
4,212,493 A 7/1980 Ledesky ........................ 297/6
4,239,248 A 12/1980 Ewers ......................... 280/42
4,312,505 A 1/1982 Englehart .................. 272/70.3
4,342,465 A 8/1982 Stillings .................. 280/87.02
4,463,817 A 8/1984 Hennesson ................. 180/65.5
4,621,804 A 11/1986 Mueller ..................... 272/70.3
4,632,409 A * 12/1986 Hall et al. .................. 280/648
4,770,410 A 9/1988 Brown ...................... 272/70.3
4,807,870 A 2/1989 Hickman ................... 272/70.3
4,861,051 A 8/1989 Napper .................. 280/87.021
4,890,853 A 1/1990 Olson .................... 280/87.021
4,907,794 A 3/1990 Rose ......................... 272/70.3
5,058,912 A 10/1991 Harroun ................ 280/87.021
5,083,806 A * 1/1992 Brown .................... 280/87.05
5,112,044 A 5/1992 Dubats ........................ 482/68
5,148,559 A 9/1992 Morris ......................... 5/86.1
5,167,597 A 12/1992 David ......................... 482/68
5,172,715 A 12/1992 Webb .......................... 135/67
5,224,721 A 7/1993 Santmann .............. 280/87.051
5,255,697 A 10/1993 Grauer ........................ 135/67
5,275,426 A * 1/1994 Tankersley ............... 280/87.05
5,277,438 A 1/1994 Chuang ....................... 280/42
5,320,122 A 6/1994 Jacobson, II et al. ......... 135/66
5,351,700 A 10/1994 Jones, III et al. ............. 135/67
5,364,120 A * 11/1994 Shimansky .............. 280/87.05
5,380,262 A 1/1995 Austin ......................... 482/68
5,411,044 A * 5/1995 Andolfi ................... 280/87.05
5,467,793 A * 11/1995 Hart ...................... 280/87.021
5,520,402 A 5/1996 Nestor et al. ............... 280/250
5,538,268 A 7/1996 Miller ..................... 280/87.05
5,676,388 A * 10/1997 Bertani .................... 280/87.05
5,732,964 A * 3/1998 Durham et al. .......... 280/87.05
5,997,444 A * 12/1999 McBride ...................... 482/69

OTHER PUBLICATIONS

"Ambulatory Support," ATO Walker, Sold by Smith & Nephew Rolyan, Inc.

"Rehabilitation Frame, Model Ultra 6000," Sold by Sintef Rehab Oslo, Intercon Marketing Corporation.

"The U–Step Walking Stabilizer," In–Step Mobility Corporation.

"Prone Stander, Stabilflex with table and wheels, and Walker," Distributor Colombo USA LLC.

"Helping Older People Do The Walk Of Life," Wall Street Journal, Jul. 16, 1991.

"Wheeled Walkers and Accessories," Medical Equipment Distributors, Inc.

"Arrow Walkers," Triaid, Inc.

"Pony Walker," Etac USA.

"NOVUS," Healthcare Solutions, Inc.

"Peer Level Stander™," Mulholland Positioning Systems, Inc.

"Dynamico With Chest And Pelvic Support".

"The Rendier," Tromp Technical Trading, Netherlands.

"Cable Controls and Actuation Products," Cable Manufacturing & Assembly Co., Inc.

"Bloc–O–Lift," Stabilus, West Germany.

"Gas Cynlinders–The Foundation of Modern Office Chairs," Suspa Compart AG, Numberg, Germany.

* cited by examiner

METHOD AND SYSTEM FOR CONCENTRATED PRIMARY SUPPORT FOR A USER IN SUPPORT ASSISTIVE DEVICES

This application is a United States National Phase filing of International Application No. PCT/US96/20698, filed Dec. 12, 1996, which claims the benefit of U.S. Provisional Application No. 60/008,649, filed Dec. 14, 1995.

TECHNICAL FIELD

Generally, this invention relates to the field of medical support assistive devices. Specifically, the invention focuses upon concentrated vertical and horizontal support in certain bony structures of the body to assist and support a user in ambulation of medical support assistive devices.

BACKGRUND ART

The medical field of medical support assistive devices is generally well known. Many patents through the decades have been focused upon this particular area. Generally, the patents focus upon restraining support of different areas of the body depending on the different capabilities of the user. For instance, U.S. Pat. No. 4,312,505 to Englehart, entitled "An Invalid's Wheeled Walker", shows a belt restraining above the waist of the user with padded arm supports to support the body. U.S. Pat. No. 5,058,912 to Harroun, entitled "Combination Chair/Walker", shows a wheeled device with a crotch supporting "diaper" arrangement. Other references show various methods of supporting the user, aged an infant to an older adult. Some of these assistive devices are stationary requiring a user to lift the apparatus, walk, and then set it down to recover for the next step. Others are mobile in that they contain rotatable elements such as wheels, casters, rollers, and so forth by which the user ambulates. Generally, these devices fall in three categories. The first category are those devices which require the user to support his body, in some cases, with only an arm rest or arm support. Thus, the arms can tire frequently as the user ambulates. The next category requires the user to be strapped in and held typically about the chest, waist, or fixed about a large portion of the hips. This type of restraint can be intimidating for some users, uncomfortable for others, and can produce chaffing and skin irritation. Other supports are for the more physically disadvantaged, in that the user is not able to support his weight, and must rely upon either others to assist the person in his ambulation or upon power-operated movement such as a battery powered wheel chair. One example of a commercial assistive device is known as the Arrow Walker developed overseas by Theraplay Limited in Kelwinning, Scottland, and is sold in the United States by Triad, Inc., from Cumberland, Md. It advertises that it helps children "experience the joy of independent movement." However, in viewing the depiction of the product, even it does not appear to rely upon pelvic movement, but relies upon arm and hand support and movement to ambulate. The pelvis does not appear to be engaged in a frontal horizontal plane; instead, the upper chest is saddled. Another example of a commercially available embodiment is known as the U-step made in the United States by In-Step Mobility Products Corporation of Skokie, Ill. It again is of the type that relies upon arm and hand support to assist the user.

In reviewing the available references, it is apparent that a gap is missing in the field of support assistive devices. The gap is filled by the present invention. The gap that is missing includes the ability to allow a normal gait of a user, who is able to at least partially support his weight, without the use of, or the substantial use of, hands or arms to support the user's weight. The may be done selectively by concentrated and limited engagement of the user's pelvis. Furthermore, the device may assist the user in changing elevations through power assistive systems and may include rotatable elements, such as wheels, an improved braking system, and a swivel lock system.

This area of improvement has heretofore gone unnoticed in spite of a long felt need and the long available arts and elements. What is surprising is that the present invention fills the gap even through the field is crowded with a wide variety of devices and improvements. Certainly, those in the art appreciated that a problem existed in attempting to make more comfortable and useful assistive devices, yet apparently failed to appreciate the solution. With the field crowded, it may be apparent that those skilled in the art made substantial attempts to fill the need, but were unsuccessful in achieving what the present invention accomplishes. In contrast, the apparent direction of the art was to teach away from the technical direction of the present invention in that, among other aspects, generally the direction was to support more rigidly more area of the body, not less, as the present invention teaches. Furthermore, the present invention is unique in its combination of results from what some could consider simple and available elements. Actually, this direction resulted in the unexpected results of the present invention in that focused and limited support could be made and yet allow a user to be supported even in case of a lapse into unconsciousness.

DISCLOSURE OF THE INVENTION

The present invention involves a unique awareness of key support areas that allows a user to ambulate without undue restriction. It recognizes the importance of supporting primarily at two bony structure of the body, restrains the pelvis in a limited fashion, and enables the user to walk, turn, and raise and lower with minimal or no arm and hand involvement. The two primary bony structures of the pelvis used in the present invention typically may be the ischial tuberosities and the anterior superior iliac spines. A typical person using the devices will have two of each, unless through some physical disability or surgery, they have been removed or otherwise might not have the full support of both bony structures. The invention could work in some degree for even those individuals without both ischial tuberosities and both anterior superior iliac spines. The present invention realizes a key is to support in these focused areas and not to restrain in the other areas that typically were taught in the art. This focused engagement allows a large degree of movement, comfort, and ambulation. When used with an elevation assembly, the present invention may allow variable weight-bearing that can encourage physical conditioning as well as assist people with permanent disabilities. Its present structure can reduce falls, increase mobility and day to day functionality, and assist in returning to the work force.

One object of the present invention is to provide a support assistive device for a user having a frame assembly, a vertical pelvis support element connected to the frame, and a horizontal pelvis support element supporting primarily the anterior superior iliac spine of a pelvis. One goal of this object is to provide such a device that assists in improving the gait stride of the user as well as a forcing element to assist the user in weight-bearing and in elevation adjustments. Another goal is to provide the improved gait with minimal or no hand or arm support. Another goal of this object is to support primarily the ischial tuberosities while supporting anterior superior iliac spines. FIG. 6 shows with specificity the locations of the anterior superior iliac spine and the ischial tuberosities using a skeletal model. Noteworthy in this invention is the recognition that by supporting the ischial tuberosity, located behind the center of gravity of the body, a forward moment may be created. This forward moment may be counteracted by supporting the anterior superior iliac spine in a forward position, located in a frontal plane of the body. Thus, the two sets of supports oppose each other. This tends to allow full support without the substantial use (or even no use) of hands or arms to support the body. Also, noteworthy is the fact that by supporting on the anterior superior iliac spine on either side, a moment can be created to assist in turning even without the use of hands by simply turning the direction of the pelvis. In other inventions, this frontal support to counteract the moment created by supporting the ischial tuberosities is most often provided by the hands or arms. In the other inventions, also, the hands and arms may be used to create a turning moment to the device. By contrast, the created moment of the present invention is more natural to the user in turning the pelvis and as a result the device. This movement may generally be available without the use of hands, arms, and so forth in direct contrast to such products as the Arrow Walker and U-Step and others. Such support allows freedom of movement for the user and may allow the hands and arms unencumbered to perform other tasks. Another goal of this object is to provide a fluidic braking assembly for any rotatable elements, which can be advantaged to assist a user in supplying an increase of force to actuate the braking action. Other goals are to provide a single station that could brake a plurality of rotatable elements and to provide braking in any direction the wheels are turned, that is, omni-directionally. Another goal of this object is to provide a device that could be lowered to a corresponding elevation with a lower frame assembly to assist in packaging and in transportation. Another goal is to provide a rotatable swivel lock system for the rotatable elements that may be restrained in various orientations, and may be controlled through a single station.

Another object of the present invention is to provide a support assistive device having a frame assembly, a vertical pelvis support element, and a horizontal pelvis support element that supports primarily in the forward position and at a separate elevation or location from the vertical pelvis support element. A goal of the present invention is to allow the pelvis to be supported with a left and right support element which may act independently of each other. Another goal of the present invention is to provide a biasing element to bias the pelvis toward the pelvis support while vertically supporting the pelvis primarily at a first or lower bony structure and while horizontally supporting the pelvis in a forward position at a second bony structure in a frontal plane of the pelvis. A goal of the invention is to provide elevation adjustments commensurate with the appropriate locations of supporting the bony structures. A further goal of the present invention is to provide a support assistive device having a plurality of rotatable elements and a fluidic braking assembly to brake the rotatable elements. Such a goal could include the advantaging of the braking assembly to assist the user in actuating the brakes. It could also include a single braking station and a swivel lock system to include a plurality of rotatable elements.

A further object of the present invention is to provide a lower frame assembly and an upper frame assembly with a plurality of rotatable elements such that the upper frame assembly may be horizontally lowered (or otherwise change elevations) to a corresponding elevation with the lower frame and may include the rotatable elements folding within the envelope of the frame.

Still, a further goal of the invention is to provide a support assistive device with a lower frame assembly, an elevation assembly to assist in elevation adjustments, and an upper frame assembly. The upper frame assembly could include a vertical pelvis support element, a horizontal pelvis support element to support at least one anterior superior iliac spine, and adjustment elements to adjust the proximity of the vertical pelvis support element with respect to the horizontal pelvis support element. One goal could include providing a forcing element such as a pressurized cylinder to assist the support elements in adjustments.

Naturally, further goals and objects of the invention are disclosed throughout other areas of the specification and claims.

BEST MODE FOR CARRYING OUT THE INVENTION

The basic concepts of the present invention may be implemented in a variety of ways. It involves the support assistive device, the method of using the support assistive device, different aspects of the support assistive device such as braking, weight-bearing, pelvic supporting, swiveling, and folding of the support assistive device. Furthermore, various aspects mentioned above may be applicable to a variety of devices and where applicable could include wheelchairs, gurneys, and other devices. Various techniques related to the device and steps are inherent to the utilization. They may simply be the natural result of utilizing the device as intended and described. In addition, while some devices are disclosed, it would be understood that these not only accomplish certain methods, but also can be varied in number of ways. Importantly, as to all the foregoing, all of these facets should be understood to be encompassed by this patent.

Figure 3:
FIG. 3 shows a typical user using the support assistive device where the weight may be at least partially supported and yet allow a full striding gait or to otherwise ambulate depending on the user's capabilities, typically, without relying on hands and arms to support the user.

In regard to general aspects and by referring to FIG. 3, it can be seen that the present invention allows a user to ambulate with a great deal of flexibility not achieved in other devices. Also, it may be noted that the weight-bearing support assistive device can vary the weight imposed upon the legs to be commensurate with the support capabilities of the user. In some cases, it may even be that the user has minimal weight upon the legs. This could occur, for instance, if the user had become disabled in the legs or is recovering from surgery, or is otherwise in a rehabilitation process. It is also apparent by viewing FIG. 3 that by selectively engaging the pelvis as with the present invention, the support assistive device can be used without the substantial use of hands or arms. In some cases, the user may not have the capability to use hands and arms, and thus this feature is deemed important to some uses of the present invention. A third aspect, in viewing FIG. 3, is that by engaging the pelvis, the user can direct the support assistive device by simply rotating the user's pelvis as the user walks and moves. This movement conforms more naturally to normal movements and assists the user to direct the device while performing other tasks such as shopping, writing, and other functions. This function corresponds more generally and more naturally to the function that other individuals, without the need for the support assistive device, could perform. This aspect is in direct contrast to the other devices in the market place which generally require the use of hands and arms in restricted movement to use a device. A fourth aspect, in viewing FIG. 3, is shown in the open front and raised rear structure of the lower frame assembly. Thus, the user has an improved gait capability without undue restrictions generally found in other devices in the market place. Also, in reviewing other devices that support the upper torso, they may tend to restrict the weight transfer that otherwise is beneficial in initiating walking or moving.

Figure 4:
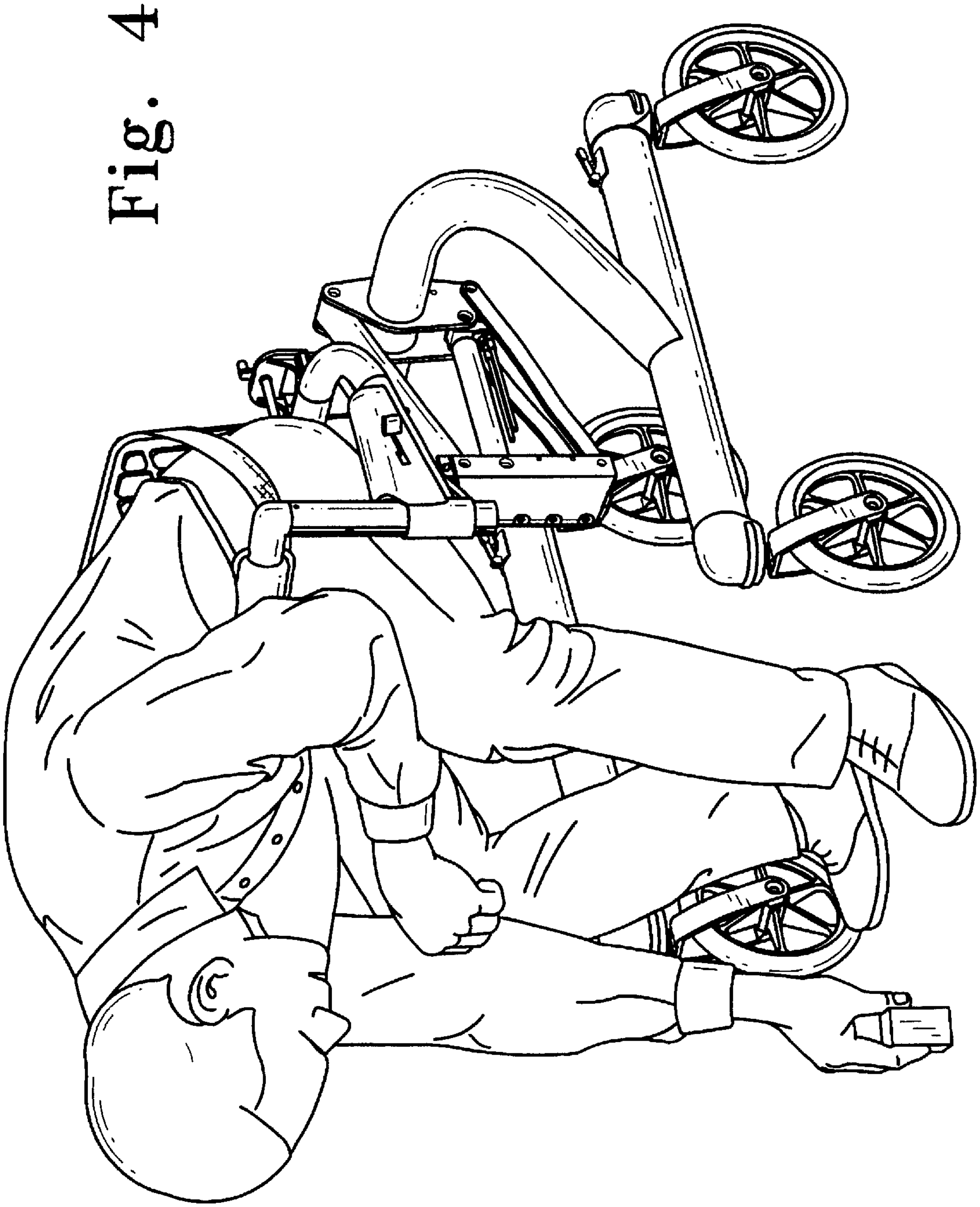
FIG. 4 shows a user using the support assistive device in a lowered position to allow picking up objects from, for instance, a floor and to subsequently return via a forcing element to a desired elevation.

FIG. 4 shows a user restrained in the support assistive device, yet able to adequately bend at the waist to pick up even small objects from a lower elevation such as the floor. One of the features of the present invention is that it engages and supports the pelvis in a minimal area and yet still allows flexibility to the user as is generally possible. This flexibility may include bending, turning, and so forth. The device as will be described in detail below, may be raised and lowered to change elevations using an elevation assembly. This elevation assembly may assist the user with the user's weight as the user changes elevations. Thus, even a user having difficulty with weight may quickly adjust the elevation using the weight-bearing support assistive device to perform various functions not normally found in other devices.

Figure 5:
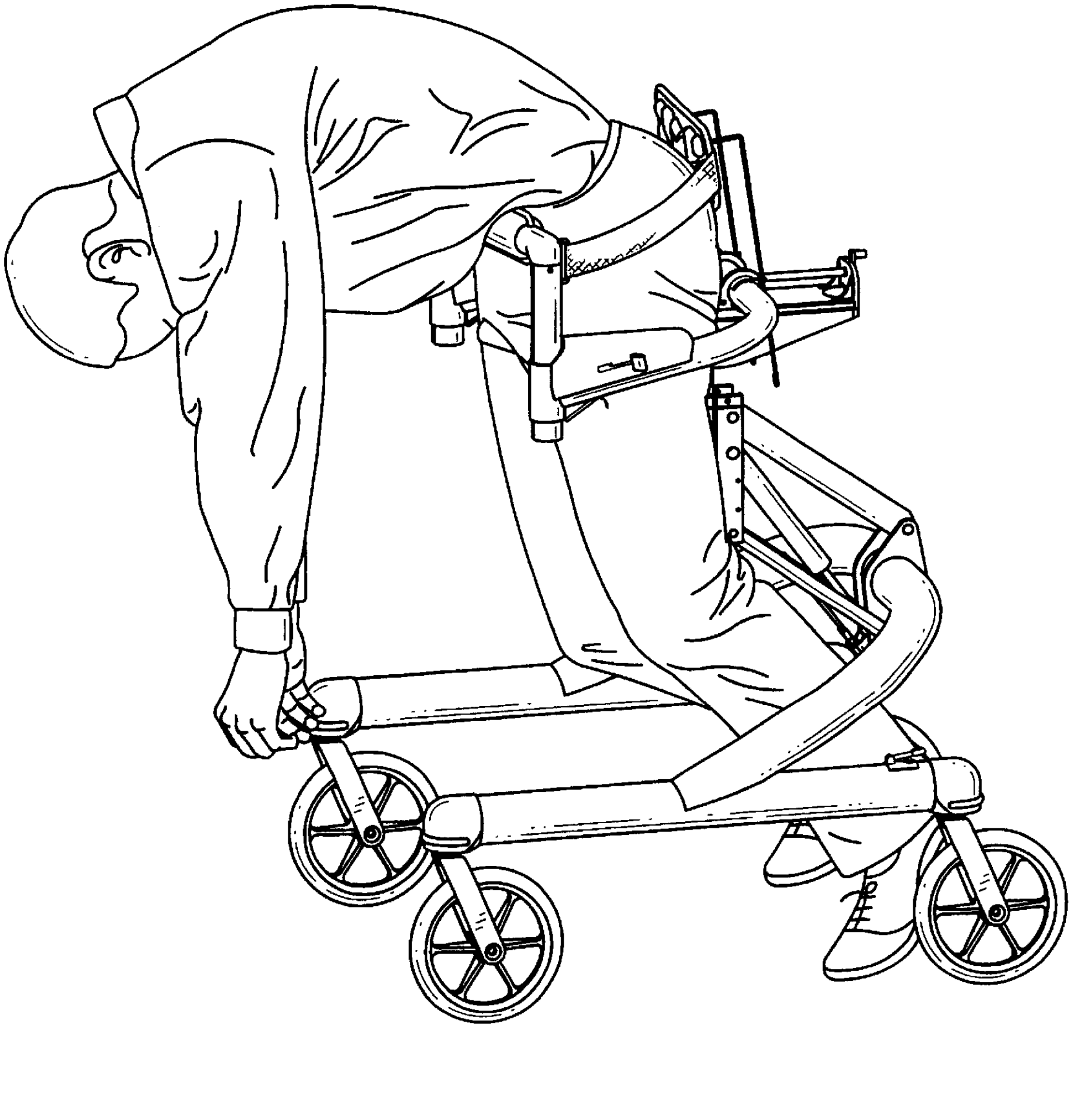
FIG. 5 shows a user in a unconscious state sufficiently retained in a support assistive device to avoid falling.

FIG. 5 shows another aspect of the present invention in that even though the user is able to freely ambulate, bend over to pick up items from the floor, and otherwise perform more natural movements, in case of unconsciousness, the user may be restrained from a fall that could injure the user.

Figure 6:
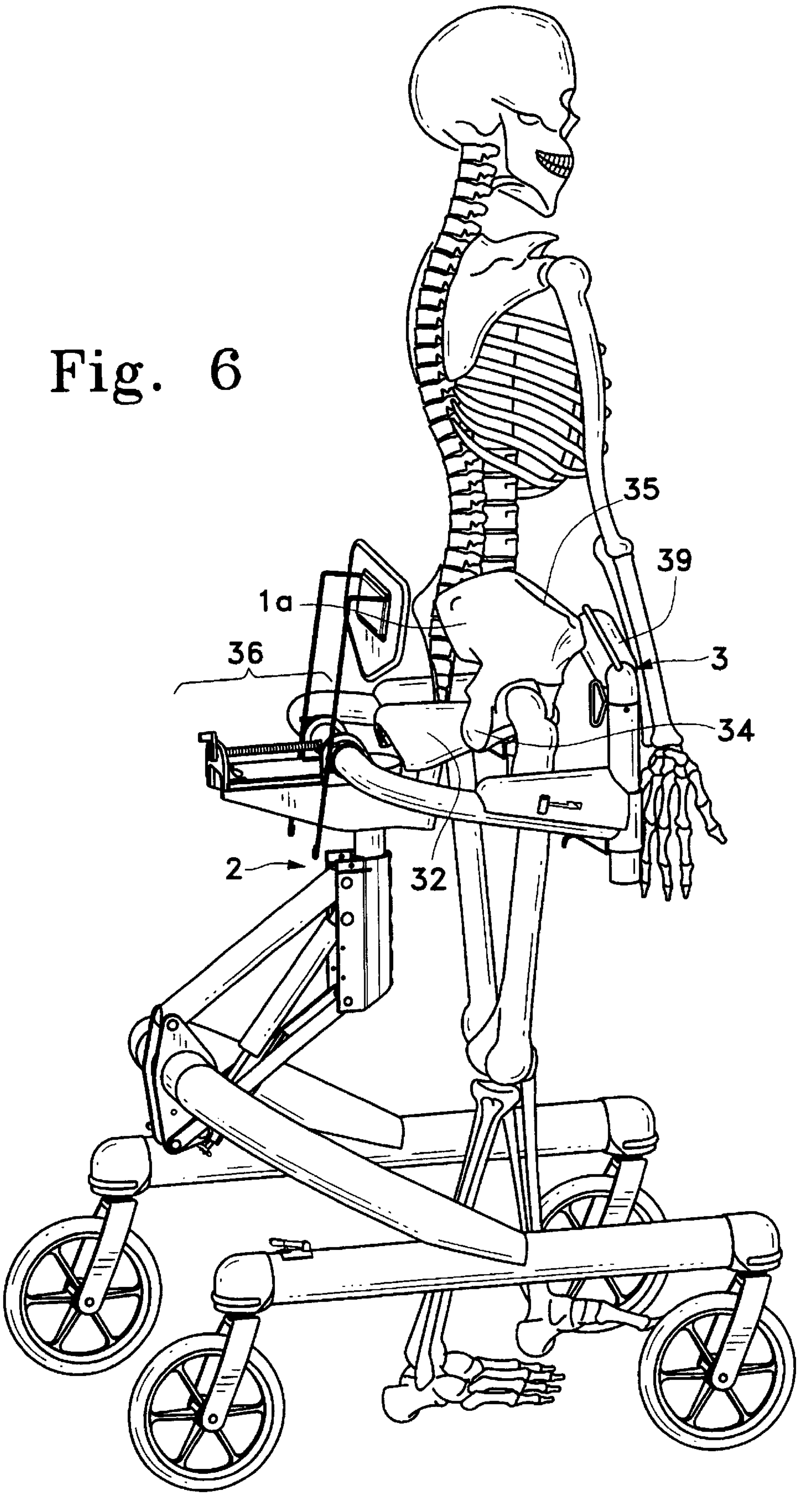
FIG. 6 shows the two areas of primary contact of the ischial tuberosities and the anterior superior iliac spines using a skeletal model.

FIG. 6 shows key aspects of the present intention. The present invention engages and supports the pelvis (1*a*) in primarily two bony structures typical of pelvic structure. The ischial tuberosity (34) is shown supported by vertical pelvis support element (2). The anterior superior iliac spine (35) is shown supported by the horizontal pelvis support element (3). As shown, the right support element (39) supports the right anterior superior iliac spine. A mirror image may occur for the left side of the pelvis (1*a*) and the left anterior superior iliac spine.

Figure 1:
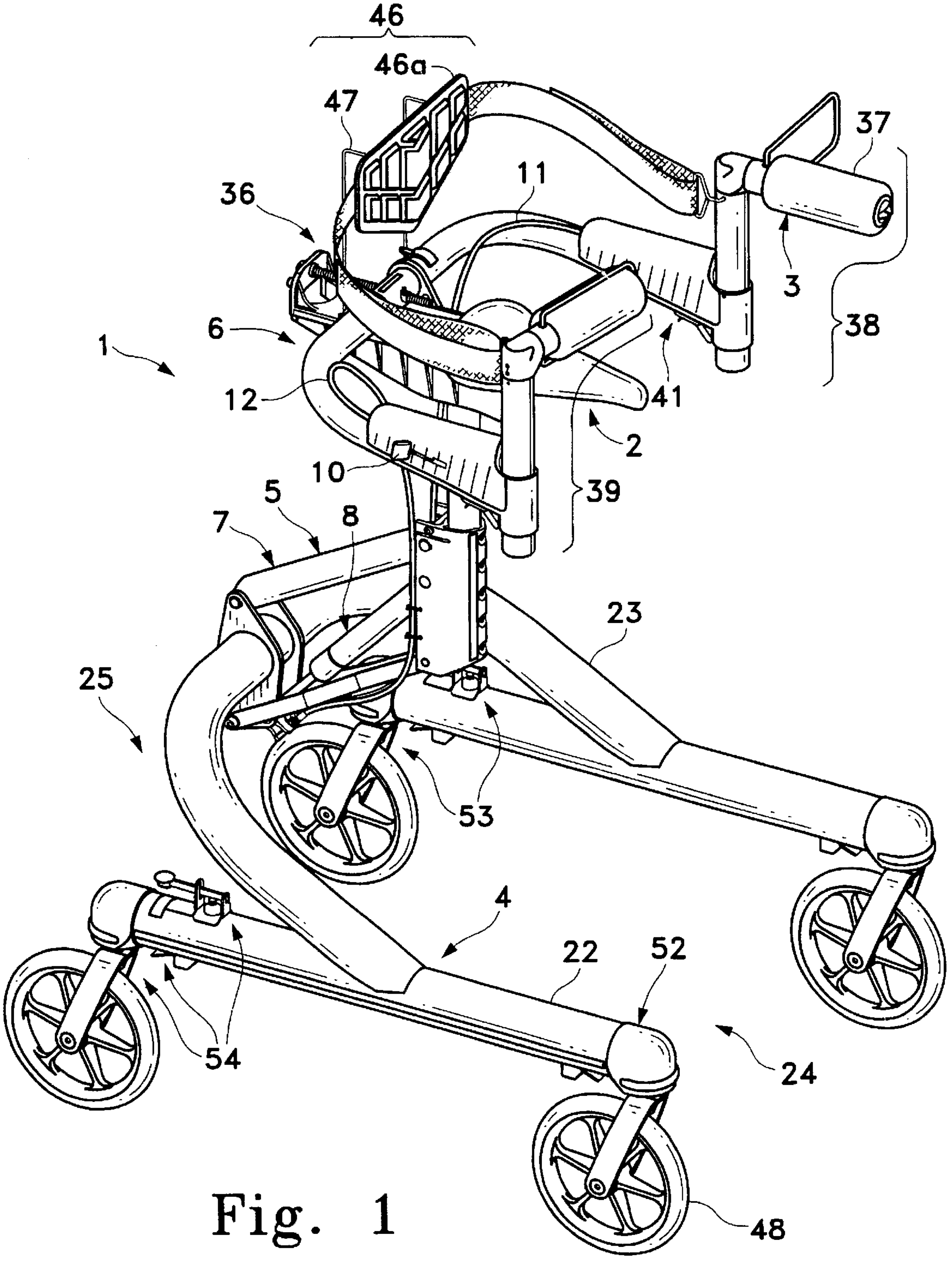
FIG. 1 represents a isometric view of the preferred embodiment of the invention.
Figure 2:
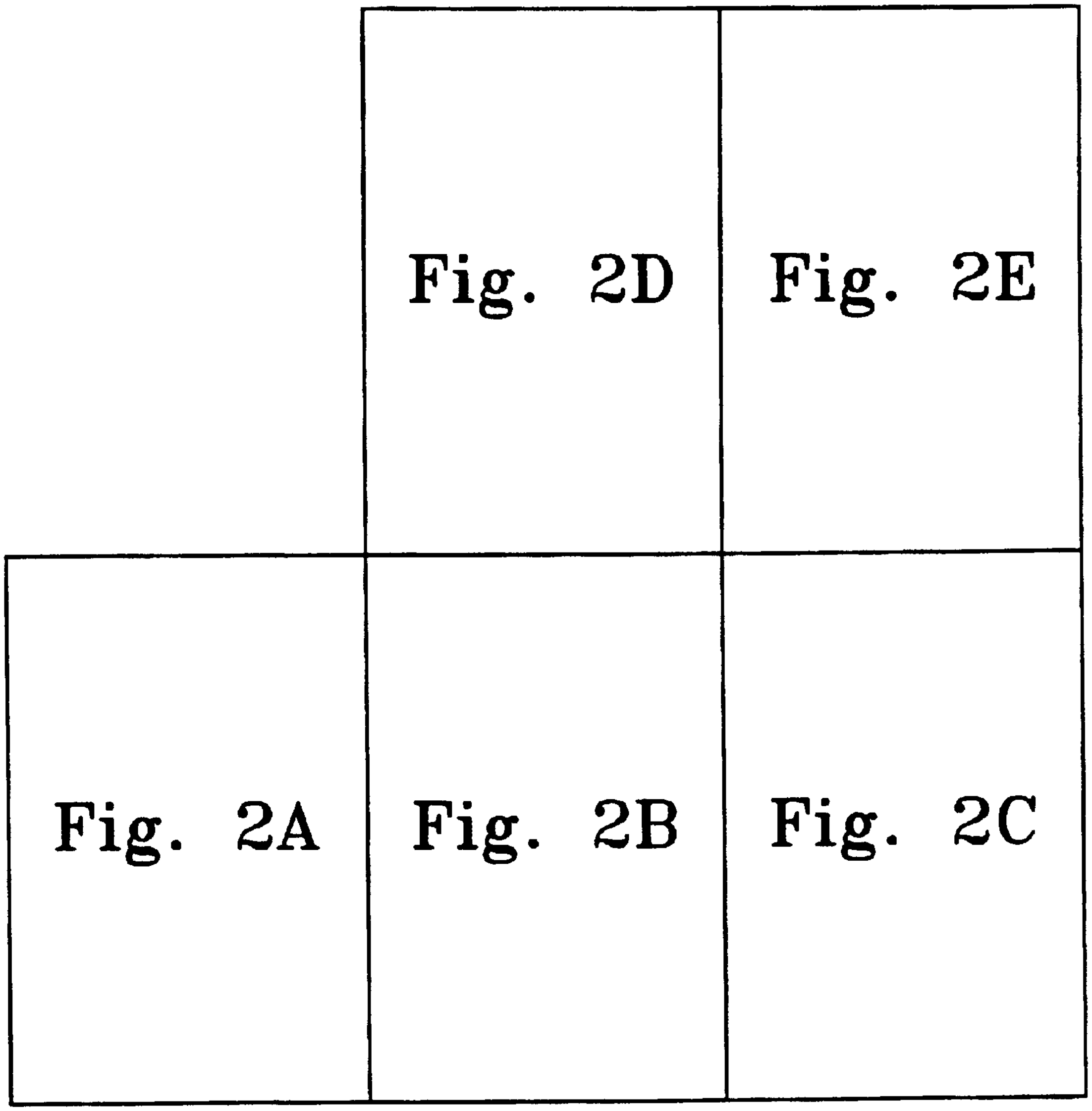
FIG. 2 represents a detailed assembly drawing of various components of the present invention shown in FIG. 1 and incorporate the individual portions of FIGS. 2A–2E.

Having described some general aspects and functions of the present invention, reference is made to FIGS. 1 and 2 in more detail. The preferred embodiment may have at least the following primary elements including a frame assembly (1) and a pelvis support which may be divided into a vertical pelvis support element (2) and a horizontal pelvis support element (3). The term "assembly" is used to mean the overall structure of the particular element and may include sub-elements, washers, bolts, and so forth or even a unitary element. The term "connected" includes direct or indirect connection, such as through intervening members and is intended to include elements that are responsive to other elements. Depending on the needs and embodiments, the frame assembly may have rotatable elements (48) attached to it. The horizontal pelvis support element (3) is designed to support primarily the anterior superior iliac spine (34) of the pelvis and may be connected to the vertical pelvis support element (2), directly or to a portion of the frame assembly. The verb "support", as used herein, at the ischial tuberosity and the anterior superior iliac spine, is meant to include support in the proximity of the forward protrusion of the anterior superior iliac spine or the lower protrusion of the ischial tuberosity. This is to allow for some variation in the comfort of the user to adjust the engagement point slightly above or below or to the left or right of the most forward protrusion of the anterior superior iliac spine or lower protrusion of the ischial tuberosity. (Obviously, in most cases, the support could be transferred through the intervening tissue, muscle, and fleshy portion to these bony structures.) The term "element" may be a single device or may be composed of multiple devices, such as sub-elements. The term "primarily support" is meant to include the majority of support needed to accomplish the goals and objects of the present invention and to exclude other support that would interfere with the goals and objects of the present invention, and could be in contrast to other devices that, for instance, surround and engage the entire periphery of the pelvis.

Figure 2A:
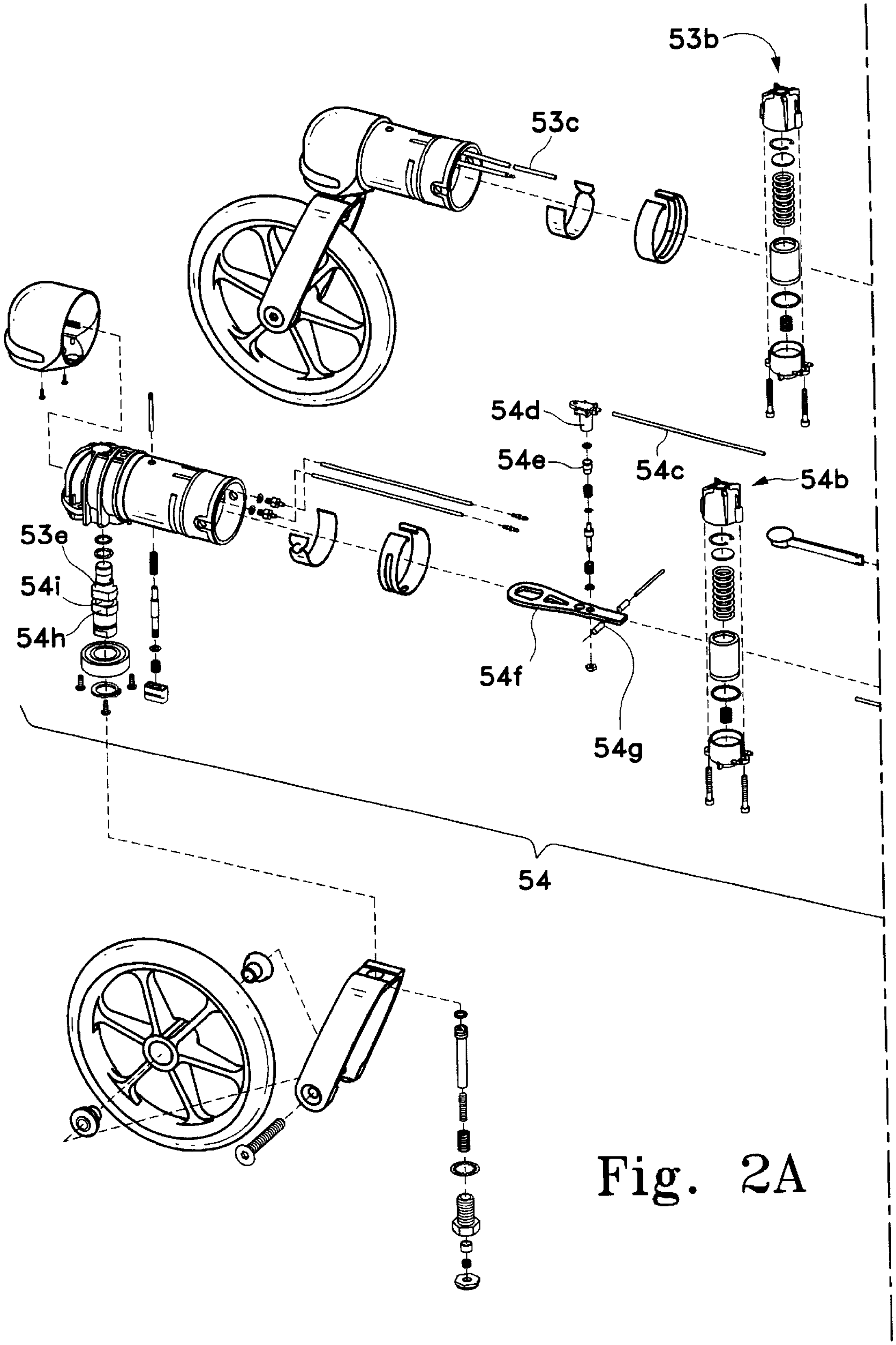
FIGS. 2A–2E represent various individual portions of the overall present invention.
Figure 2B:
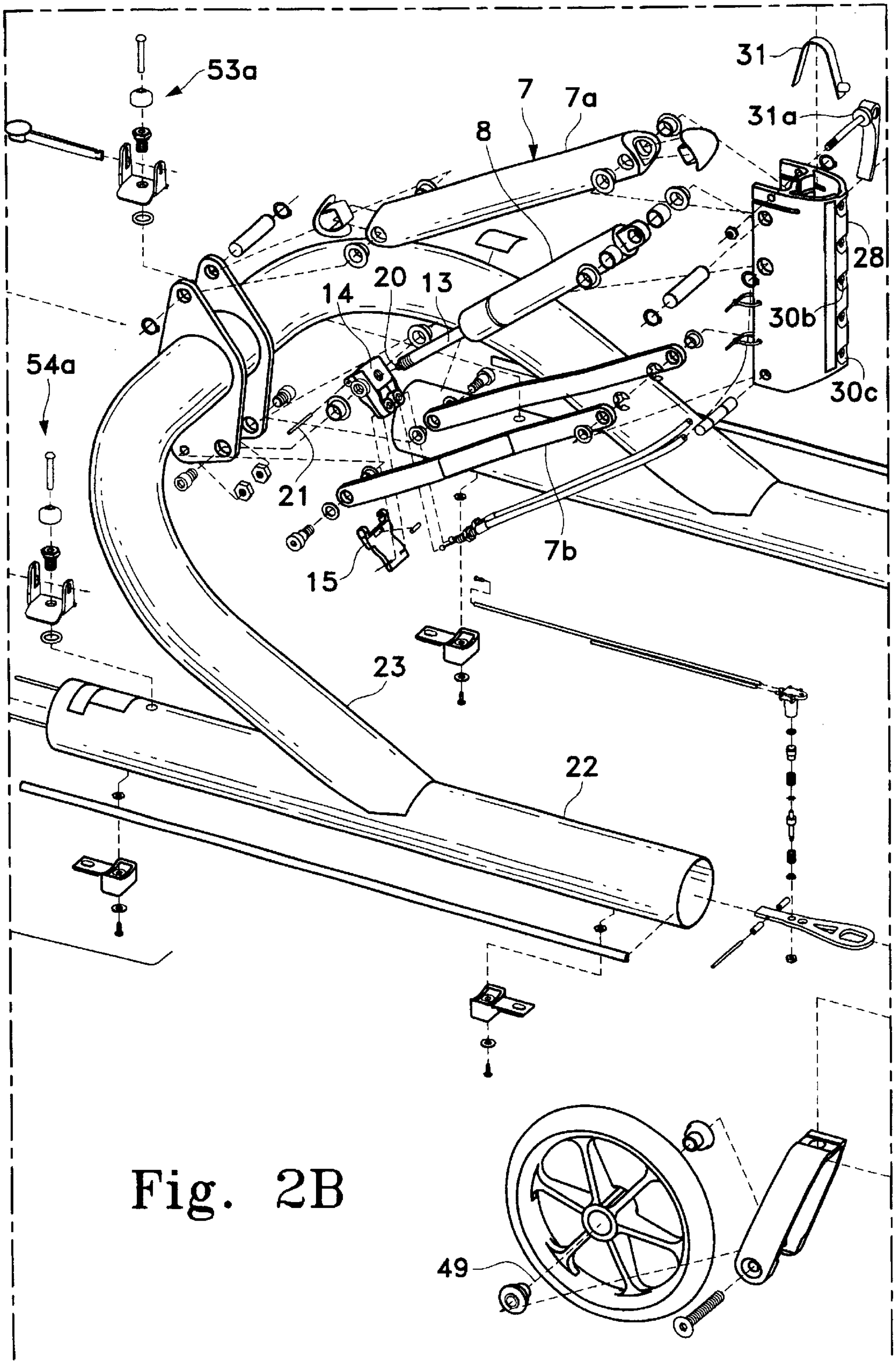

The frame assembly (1) may be made from appropriate materials and may include a variety of other aspects such as rubberized bumpers, internal mechanisms to be described below, and other features. One feature of the preferred embodiment may be that the device may use the inner volume of the frame assembly to hold various components in the invention such as tubing, brake cylinders, cams, and other features. This allows for a less obtrusive external appearance. Part of the frame assembly (1) includes the lower frame assembly (4), an elevation assembly (5) connected to the lower frame assembly (4), and an upper frame assembly (6) connected to the elevation assembly (5). The elevation assembly (5) may include a four bar linkage assembly (7) which assists to maintain a horizontal orientation of the upper frame assembly (6) at different elevations. The four bar linkage assembly (7) is well known to those in the art, and may include an upper linkage element (7*a*) and a lower linkage element (7*b*). These may be rotatably connected to the upper frame assembly on one end and the lower frame assembly on a second end of each lower and upper linkage element. To assist the user in adjusting the weight-bearing pressure, the elevation assembly may also include a forcing element (8). Particularly, in the preferred embodiment, the forcing element (8) may include a pressurized cylinder as is shown in FIGS. 1 and 2(B). The pressurized cylinder may not only be adjustable for elevation and weight-bearing, but may also assists in collapsing and folding the preferred embodiment for transportation and storage.

Figure 2C:
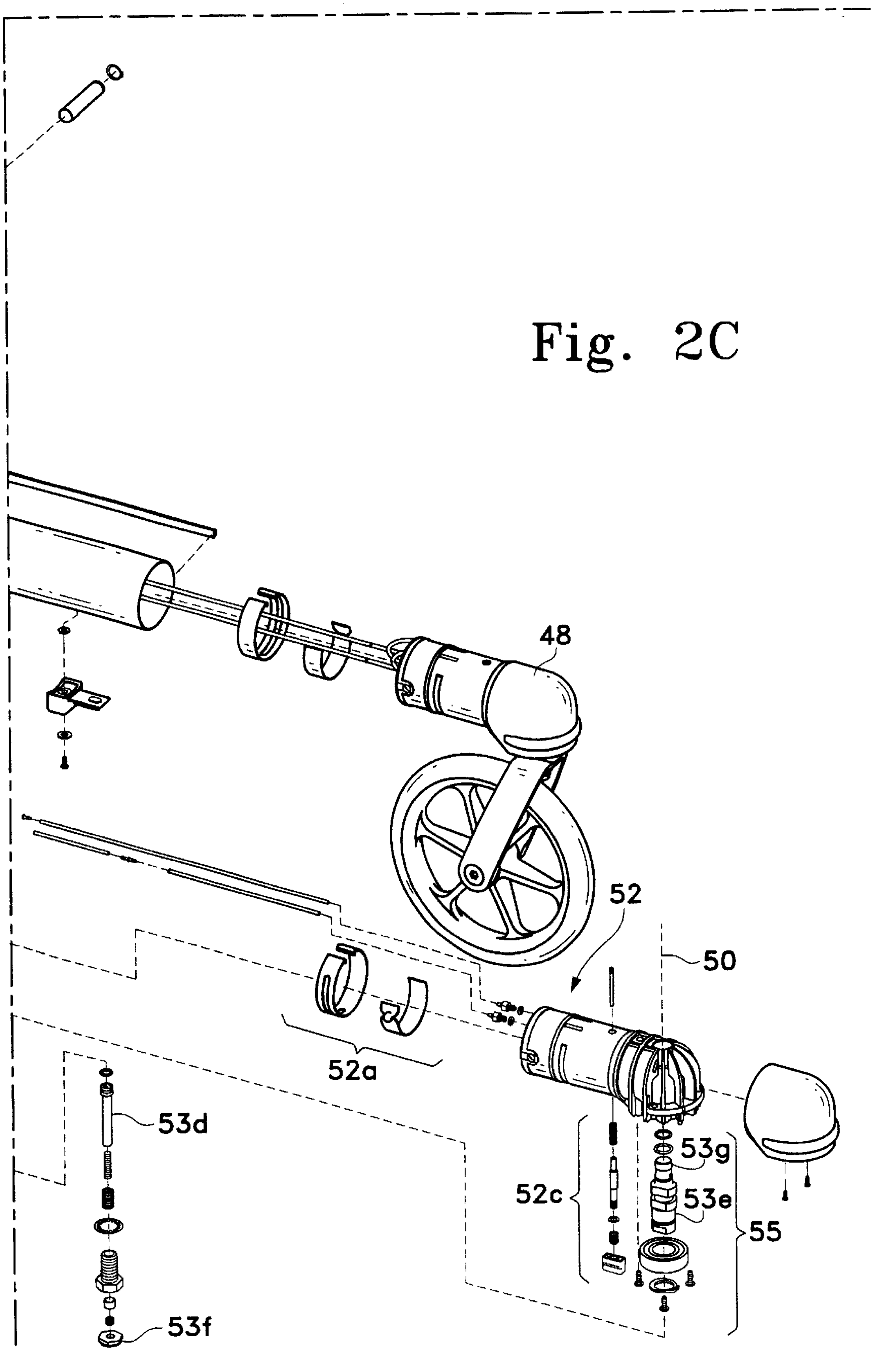
Figure 2D:
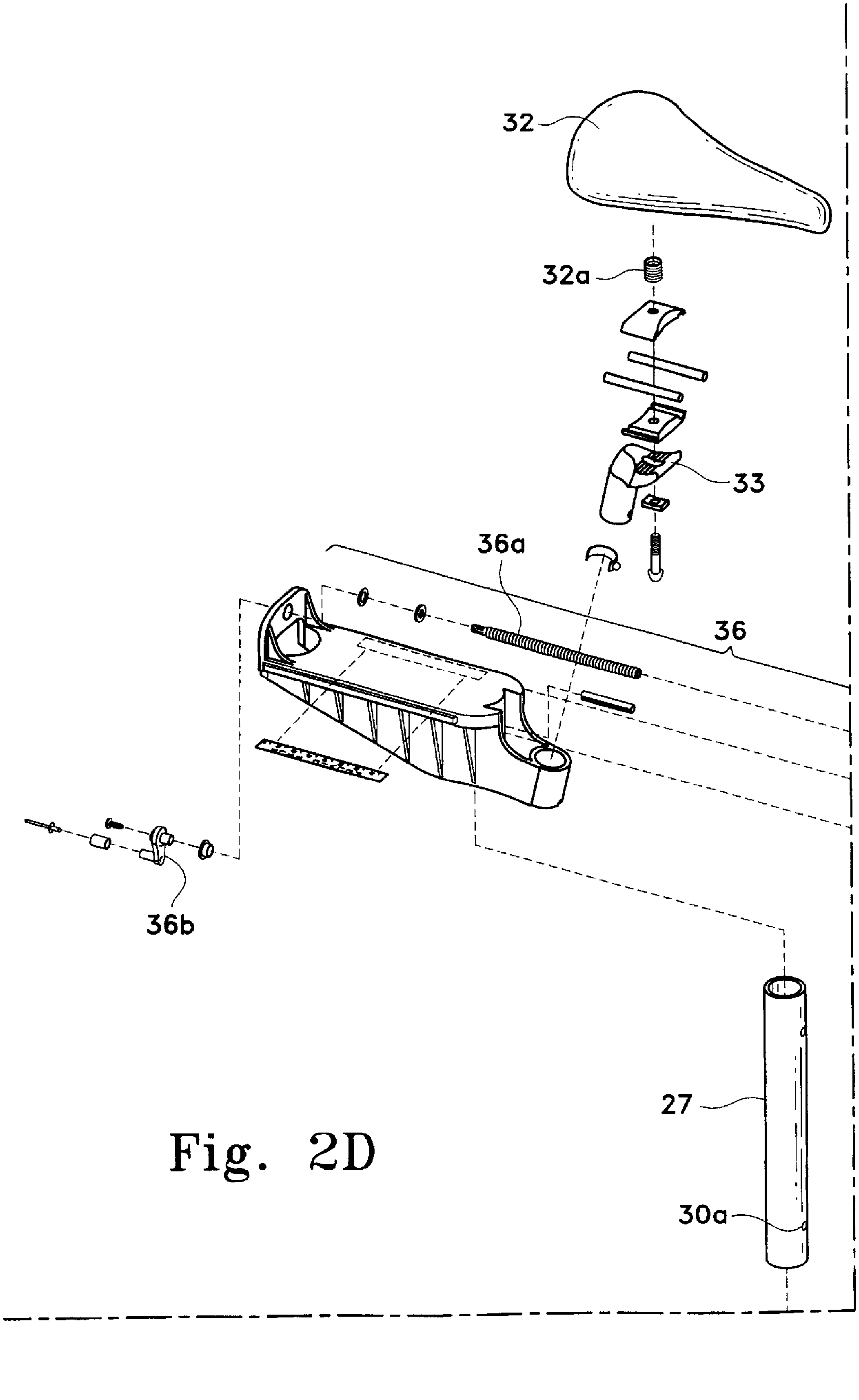
Figure 2E:
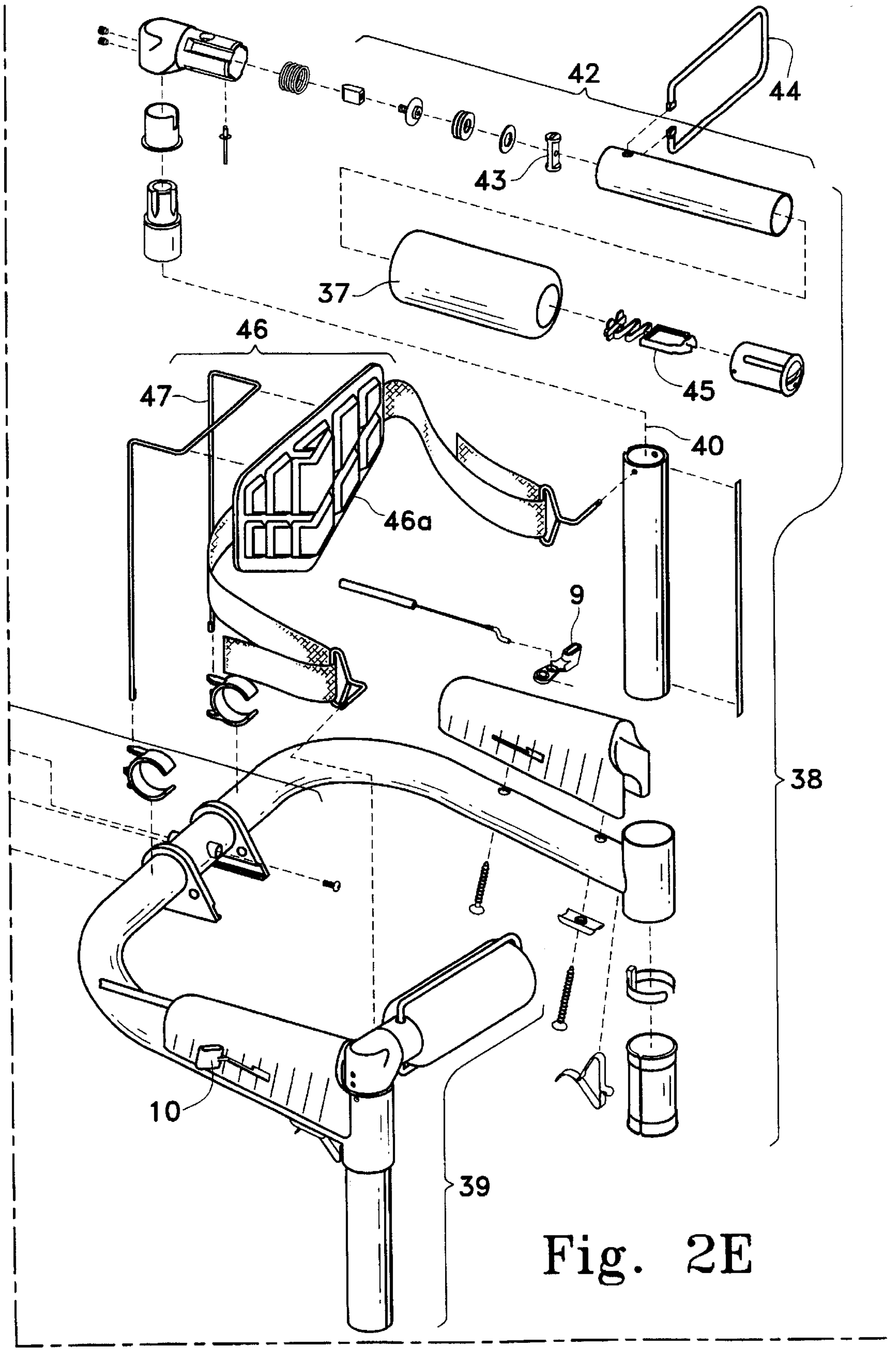

In contemplation of the preferred embodiment, the present invention may allow actuation of the forcing element (8) from both or either side of the upper frame assembly (6) with a left actuation tab (9) and a right actuation tab (10), as shown in FIGS. 1 and 2(E). Of course, the actuation tabs could be positioned at different locations. The location shown may be conducive to hand actuation, but any other actuation may be accomplished at various locations. The embodiment shown contemplates two tabs, although more or less could be used, as those with ordinary skill would naturally understand. In FIGS. 1 and 2(E), two cables are shown. A left actuator cable (11) and right actuator cable (12) typically are connected to left actuation tab (9) and right actuation tab (10). Although a cable is envisioned, other devices and methods could be used, as would be recognized by those with ordinary skill in the art. The forcing element (8), which for purposes of this embodiment may be a pressurized gas cylinder, may have a rod (13). FIG. 2(B) also shows an actuator base (14) described in more detail below.

Figure 7:
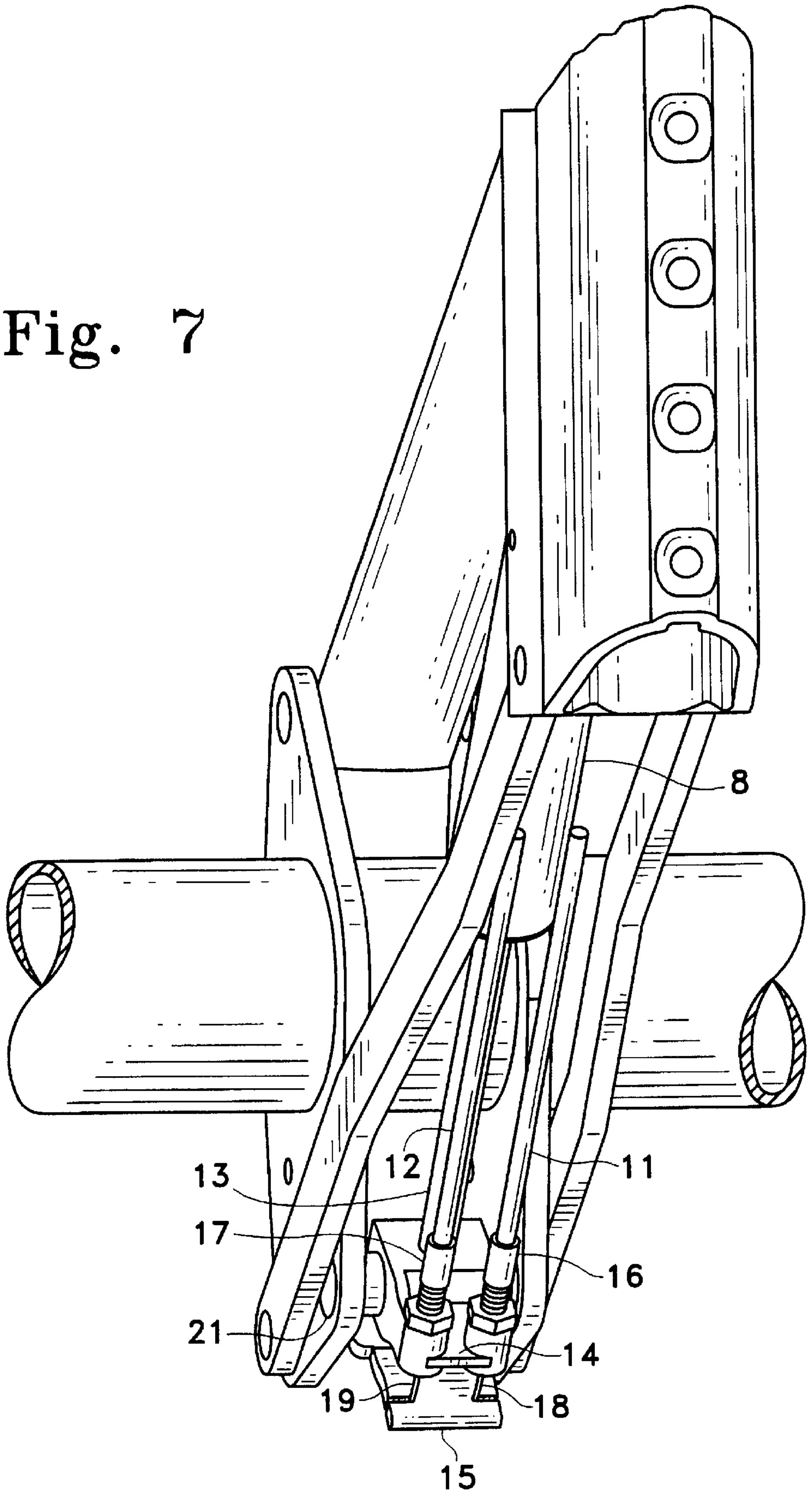
FIG. 7 shows a detail of a dual actuated cylinder actuating lever, used in the present invention to actuate the elevation assembly from a plurality of locations.

More specifically, in FIG. 7, the rod (13) may be mounted to the actuator base (14). Also, the left actuator cable (11) and right actuator cable (12) may be mounted to the actuator base (14) through a left coupling (16) and a right coupling (17), respectively. An actuator lever (15) may be attached to the actuator base (14) and may pivot about actuator pin (21), shown in FIG. 2(B). As is customary with cables of the type shown, an inner wire extends through the outside covering of the cable. This is shown in FIG. 7 as a left actuator wire (18) and a right actuator wire (19) extending from left actuator cable (11) and the right actuator cable (12), respectively. As shown, the left actuator wire (18) and right actuator wire (19) may directly and independently be attached to the actuator lever (15). In one preferred embodiment,, a pressurized gas cylinder, having an actuator (20), could be used and engaged by the actuator lever (15) to release the rod (13) and obtain the desired movement. Having a plurality of actuation points as described above, that may operate directly and independently, could allow for direct and generally less encumbered actuation from a plurality of locations, and appears to be unknown in the market place before the present invention. Each location can directly activate the actuator without necessitating junctions and other intermediate transitions. Each location also can activate, independent of other locations, the actuator lever (15). While the term actuator lever has been used, the concepts could apply to any system actuating a pneumatic or hydraulic cylinder. For the purposes of this embodiment, a locking gas cylinder may be used for the forcing element (8). As those with ordinary skill in the art could learn, locking gas cylinders are available in the marketplace as spring blocking or rigid blocking. Either could be used with the present invention, although the spring blocking type could have an advantage in flexibly moving vertically with the gait of the user's pelvis. Locking gas cylinders include an actuator that internally releases gas pressure upon actuation. The actuator is depicted in FIG. 2(B) as actuator (20). Typical brands include BLOC-O-LIFT® by Stabilus, as shown, or those cylinders made by the Suspa or other companies.

Thus, by understanding the above description, it can be seen that either actuation tab may be used to actuate the forcing element (8) by moving its actuator wire in its respective actuator cable. As the actuator wire is moved, the actuator lever (15) pivots toward the actuator base (14) and presses the actuator (20) which actuates the cylinder to assist in raising or lowering the upper frame assembly (6). The advantage of this mode of actuator is that a multiple of actuation tabs may be used from any location conducive to the user or even an assistant to actuate the forcing element (8).

Referring again to FIGS. 1 and 2(B), the elevation assembly (5) may assist in maintaining the upper frame assembly (6) in a generally constant pelvic orientation at a variety of elevations. This feature may assist the support of the user's pelvis in a consistent angle as the elevation changes. For instance, a four bar linkage assembly (7) could be used, known to those in the art for maintaining this constancy. The orientation of the upper frame assembly could be substantially level with respect to the plane of the lower frame assembly and the elevation assembly could assist in maintaining that orientation at a variety of elevations.

As shown in FIGS. 1 and 2(B), the lower frame assembly (4) may contain several elements. A first lower frame element (22) may form a base. It may have twin lengths of tubing or other appropriate structural forms. Connected to the first lower frame element (22) in the preferred embodiment is a second lower frame element (23). The second lower frame element (23) may be inclined in an upward manner with respect to the first lower frame element (22). By upwardly inclining the second lower frame element, the propensity of the user's legs to impact the frame members generally may be reduced and may allow a full striding gait, that is, not unduly hinder the hop rotation of the pelvic joints while moving, thus allowing more natural motion. By supporting the body in the manner described herein, the full striding gait may be accomplished without the substantial use of the arms, other than perhaps the occasional height adjustment or egress or ingress to the device and so forth. In other words, the arms in the preferred embodiment may not be necessary to support or guide the present invention as in other devices. Additionally, a first end (24) between the lower frame element (22) may be opened for east access and increased versatility in movement. A second end (25) may be closed to support the structure and the second lower frame element (23) may be elevated or may be upwardly inclined to provide clearance in the preferred embodiment while the user is walking or otherwise making a striding gait.

In the preferred embodiment, the upper frame assembly may be attached to the elevation element. Thus, the elevation element may move the upper frame assembly as a unit. If the upper frame assembly is configured to encompass the vertical pelvis support element and the horizontal pelvis support element (which in themselves may include various sub-elements described elsewhere), then the elevation element would correspondingly move these two elements as well. Naturally, the vertical pelvis support element could be configured as a separate part of the device and my be indirectly connected to the upper frame assembly. Likewise, the horizontal pelvis support element could be separate from the upper frame assembly and may be indirectly connected to the upper frame assembly. As a further available adjustment, the vertical pelvis support element may be independently adjustable (either "horizontally" or "vertically" or both) relative to the horizontal pelvis support element, even though they may be connected directly to the upper frame assembly.

The upper frame assembly (6) may include several sub-elements to support the pelvis in a generally vertical manner.

This may include the sub-element referred to as the vertical pelvis support element (2). By "vertical", the term is meant to include any direction that has a vertical component, which may not be necessarily in a strict up and down direction. (Likewise, "horizontal" is meant to include any direction that has a horizontal component, which may not be necessarily in a strict lateral direction.) Sub-elements of the upper frame assembly (6) to assist in adjustments may include a first upper frame assembly height adjustment element (27) which may slidably engage a second upper frame assembly height adjustment element (28). Each height adjustment element may have its own hole (30*a* and 30*b*) or set of holes or other apertures. At least one of the holes from one set is designed to align with at least one hole of the other set at various elevations. Once the holes are aligned, a height fixing element (31) may secure the respective position of the first and second height adjustment elements. The height fixing element may be a biased (such as a spring) pin assembly which engages at least one hole. Furthermore, the second upper frame assembly height adjustment element (28) may include notched indentions (30*c*). The notched indentions may be useful to allow the user to easily push or otherwise disengage the height fixing element (31) away from the holes (30*a*). Such notched indentions may provide extra clearance to disengage the pin to assist in making the adjustments of the first upper frame assembly height adjustment element (27). Notched indentions could be useful in other arrangements in other joints of the device for similar reasons. A collar type clamp (31*a*) may also be used to secure the height of the first upper frame assembly height adjustment element (27) with respect to the second upper frame assembly height adjustment element (28). Other variations for adjustment are certainly possible. As an example of an alternate embodiment, the upper frame assembly (6) could include a pressurized cylinder for adjusting similar to the forcing element (8).

The vertical pelvis support element (2) may have several sub-elements to assist in supporting the pelvis. For instance, in the preferred embodiment, it may include a vertical pelvis support engagement element (32) and associated mounting tubes, clamps, and hardware, such as may be useful to connect it to the upper frame assembly (6) and to provide its own adjustments. Obviously, it could be connected to the frame assembly independent of the upper frame assembly. The vertical pelvis support engagement element (32) may be shaped similar to a bicycle seat. Generally, it may be a support surface that would be of comfort to the user and yet allow a full striding gait, where the user may be capable of such gait, and generally would be designed to support primarily a lower bony structure of the pelvis such as the ischial tuberosity. Typically, the vertical pelvis support engagement element (32) may be located in an upper area of the vertical pelvis support element (2). To aid in flexibly allowing movement of the vertical pelvis support engagement element (32), a flexible element (32*a*) may be used. This flexible element may include a coil spring, leaf spring, pressurized cylinder, or other device that would flexibly allow movement as the user ambulates. Location in proximity to the vertical pelvis support engagement element (32) may be an adjustable tilt angle element (33). As shown in FIG. 2, the adjustable tilt angle element (33) may include a slot and angular or curing members that allow the vertical pelvis support engagement element (32) to be repositioned to different angles for the user's comfort.

Referring to FIG. 6, the vertical pelvis support element (2) in the preferred embodiment may primarily support a first bony structure. More specifically, it primarily supports at least one of the ischial tuberosities (34) with the vertical pelvis support engagement element (32). The horizontal pelvis support element (3) may be adjustable relative to the vertical pelvis support element (2). It my be adjustable "vertically" or "horizontally" relative to the vertical pelvis support element. For instance, to accomplish a generally horizontal adjustment, a relative adjustment element (36), such as a screw with a handle may be used, as shown in FIGS. 1 and 2. The screw with the handle will be described in detail below. Likewise, a similar arrangement could be used for the vertical relative position of the horizontal pelvis support element and the vertical pelvis support element. Other types of adjustments are also described later.

The next major element to be described in detail is the horizontal pelvis support element (3). The horizontal pelvis support element (3) may be considered one of the key elements of the present invention in conjunction with the vertical pelvis support element. The horizontal pelvis support element (3) supports the pelvis at specific areas, namely a second bony structure which typically could be the anterior superior iliac spine. This type of support and engagement is not taught by other devices or disclosures. The present invention realizes that such contact is needed to adequately support the pelvis. Yet, by placing such contact primarily in this area, the user may walk with a full striding gait, as the user's capabilities may allow, unencumbered by unnecessarily restrictive restrains. Furthermore, by supporting in this selective area, the user may bend, turn, tilt, and make other more natural movements not found in other devices, especially if the hands and arms are not substantially used for support. The horizontal pelvis support element (3) may pivot or otherwise move in order to contact the pelvis.

Contact with the pelvis in this area may be primarily through a sub-element of the horizontal pelvis support element, referred to as the horizontal contact element (37). In the preferred embodiment, as shown in FIGS. 1 and 2(E), the horizontal contact element (37) may be primarily a curved element. However, other embodiments could use a small pad that primarily contacts in the proximity of the anterior superior iliac spine. The goals and objects of the present invention might be met by the horizontal contact element being designed to contact primarily in the frontal plane a second bony structure and generally to avoid contact in other places such that movement would otherwise be restricted unnecessarily. By the use of the term "horizontal", it is specifically not meant that the engagement must necessarily be through a horizontal plane. It is intended that such horizontal support be directed to supporting the pelvis in a horizontal direction, as contrasted to the vertical pelvis support element which at least partly supports the pelvis in a vertical direction. Thus, the horizontal pelvis support element could, for instance, rotate vertically and engage the pelvis primarily in the proximity of the anterior superior iliac spine through some localized pads. Likewise, the horizontal pelvis support element could move in an angular fashion toward the anterior superior iliac spine, for instance, and still support the movement of the pelvis in a horizontal position. Other embodiments are possible. For the preferred embodiment, the horizontal pelvis support element may engage the pelvis primarily at or in the proximity of the anterior superior iliac spine in a horizontal fashion through a curved line support as shown.

Figure 8:
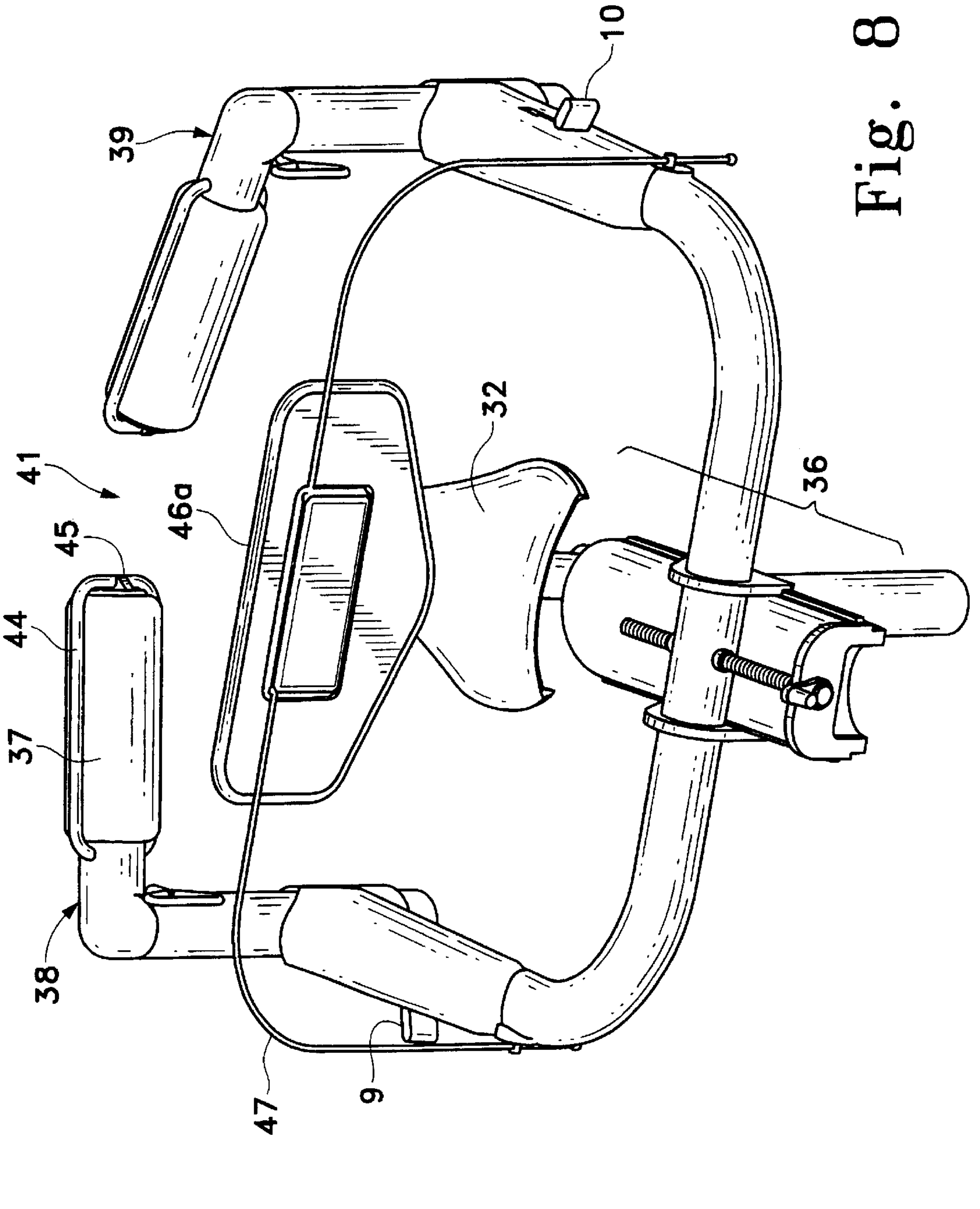
FIG. 8 shows the left and right support elements which may operate independently of each other and may leave a gap between the elements.

The horizontal pelvis support element (3) may be substantially a one piece element that could, for instance, pivot from one side. Alternatively, it may be divided into separate components. For instance, it may include a left and a right support element. Referring to FIGS. 1 and 2(E), in such an embodiment, a left support element (38) might primarily engage and support in a forward position a bony structure such as the left anterior superior iliac spine of the pelvis. Correspondingly, a right support element (39), might primarily engage and support in a forward position a bony structure such as a right anterior superior iliac spine of the pelvis. The left and right support elements might rotate about its corresponding axis denoted as upper frame axis (40) on the upper frame assembly (6). This would allow a user to rotate the left and right support elements independently to a position where the pelvis could gain access to the vertical pelvis support element (2) and then to close back and to engage and support the horizontal movement of the pelvis. As shown in FIG. 8, a gap (41) between the left support element (38) and the right support element (39) may be preferred for further comfort to the user and yet support the user sufficiently to perform the goals and objects of the present invention.

A horizontal pelvis securing element (42) may be a sub-element of the horizontal pelvis support element (3). It may also be incorporated into the individual components such as the left and the right support elements, as shown in FIG. 2. The horizontal pelvis securing element (42) may include a cam (43) and a swing element (44) with a swing securing element (45). As a user positions a pelvis on the vertical pelvis support element (2) and rotates the horizontal pelvis support element (3) toward the bony structure such as an anterior superior iliac spine, such rotation could be assisted by the swing element (44). The cam (43) and swing element (44) may assist in leveraging or advantaging the force of the horizontal pelvis support element (3) to engage the anterior superior iliac spine. The horizontal pelvis securing element (42) may additionally secure the horizontal pelvis support element into a variety of positions as is appropriate for individual users. The swing element may be secured in position by the swing securing element (45) as shown in FIGS. 2 and 8.

One of the features of the present invention is that the vertical pelvis support element (2) and the horizontal pelvis support element (3) may interactively engage and support the pelvis at locations that allow a full striding gait. Obviously, the user's capabilities may determine how far a user may stride. However, the capabilities of the present invention, by supporting in limited and specific locations, allow the user to ambulate in a manner that other devices have not allowed. and yet secure the user sufficiently. This movement may include pelvic pivot, bend, rotation, stride and other gait movements. Such a position includes supporting the pelvis vertically at a different elevation than supporting the pelvis horizontally. As mentioned earlier, the horizontal pelvis support elements supports primarily a second bony structure in a frontal plane of the user's pelvis. This is shown in FIG. 6 using a skeletal model. The frontal plane of the pelvis would include such forwardly extending structures such as the anterior superior iliac spine.

A pelvis biasing element (46), as shown in FIGS. 1 and 2(D), may be attached to the horizontal pelvis support element. The pelvis biasing element (46) could be also attached to the upper frame assembly (6) as shown in FIG. 1. The pelvis biasing element (46) may include a first restraining element (46*a*). In the preferred, embodiment, the first restraining element (46*a*) may include a belt to restrain the sacrum in a rearward plane of the pelvis. The belt may be adjustable by utilizing such elements as VELCRO®. For additional convenience, the pelvis biasing element (46) may include a second restraining element (47). One function of the second restraining element (47) could be to support the first restraining element in an appropriate location such that the user might not be required to manipulate the first restraining element when the user positioned the pelvis near the vertical pelvis support element. Obviously, as one skilled in the art would recognize, there are a variety of shapes, materials, and locations to restrain the first restraining element. FIG. 8 shows one of many alternative embodiments of the second restraining element (47). The second restraining element (47) could be, for instance, a flexible rod or spring wire attached to the upper frame (6).

In the preferred embodiment, as shown in FIGS. 1 and 2(E), the horizontal pelvis support element (3) may be independently adjustable in height to account for different elevations of different users. Such an adjustment might be similar to the height adjustment elements of the upper frame assembly (6) described above, using apparatus and methods described similar to the first and second upper frame assembly height adjustment elements. Obviously, different combinations could accomplish the goal of allowing adjustments.

The horizontal pelvis support element (3) may be adjusted relative to the vertical pelvis support element (2). Such adjustment may be made by providing notches, holes, and pins. For the preferred embodiment, however, it may be convenient to provide a handle with a screw that slidably adjusts the horizontal pelvis support element (3). This may be seen in FIG. 1 and FIG. 2(D) as a relative adjustment element (36) which may coordinate the horizontal relative position. (Obviously, a similar arrangement, and certainly other arrangements, could be available for a vertical relative position adjustment). The relative adjustment element (36) may include a screw (36*a*) which engages the upper frame assembly (6) on one end and a handle (36*b*) on another end such that the relative location of the horizontal pelvis support element may be variably adjusted. This relative adjustment element may assist the user in adjusting the tilt of the pelvis and in obtaining a more correct posture. Furthermore, the horizontal pelvis support element (3) may be adjusted with respect to the vertical pelvis support element (2) in a more vertical direction by the use of a height adjustment element, similar to that used by the vertical pelvis support element described in the preceding paragraphs. For instance, this could include a telescoping tube arrangement, secured by aligning holes and spring biased pins, as one embodiment.

Figure 9:
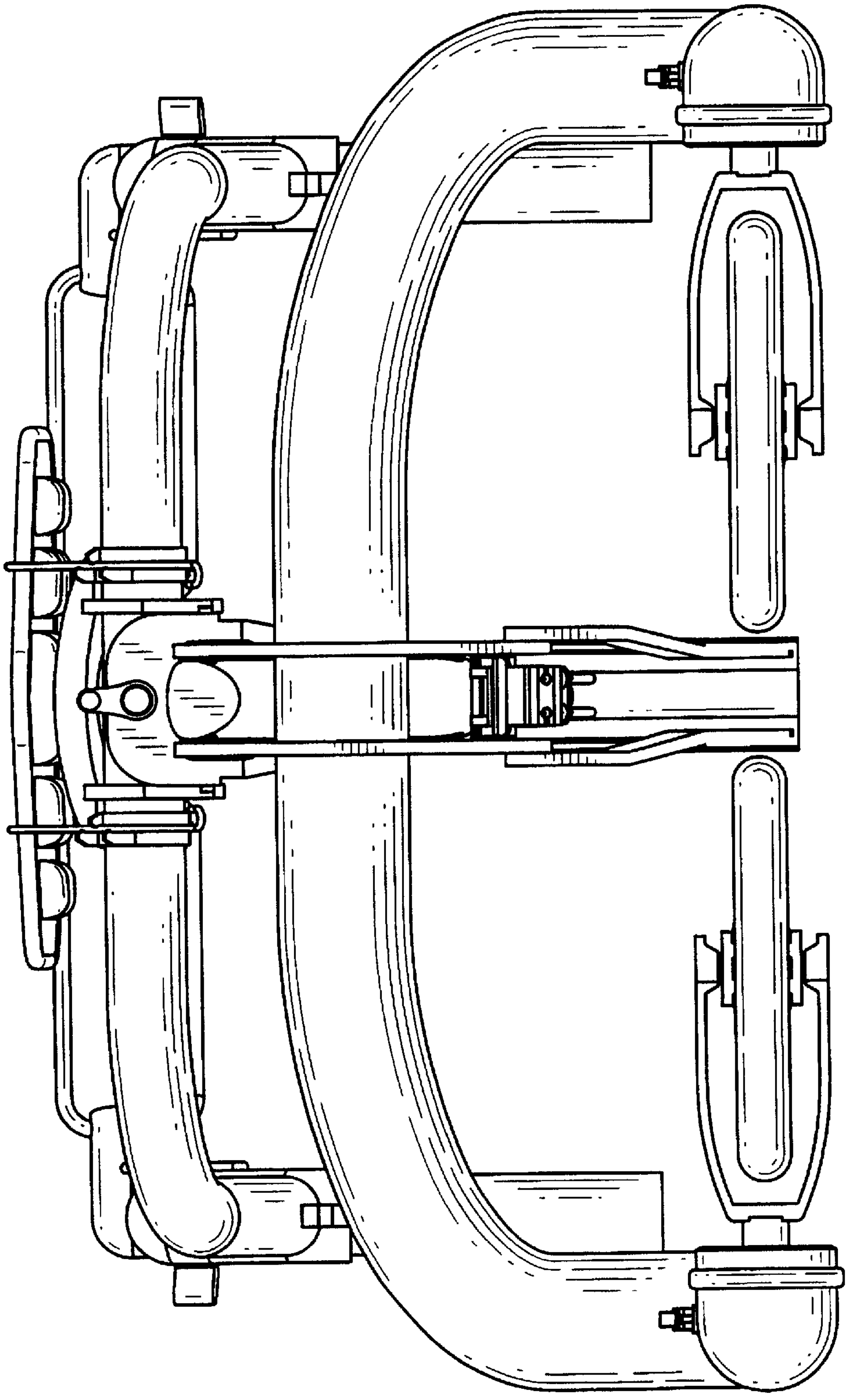
FIG. 9 shows the rotatable elements in a retracted state in a substantially planer configuration with respect to the frame members.
Figure 10:
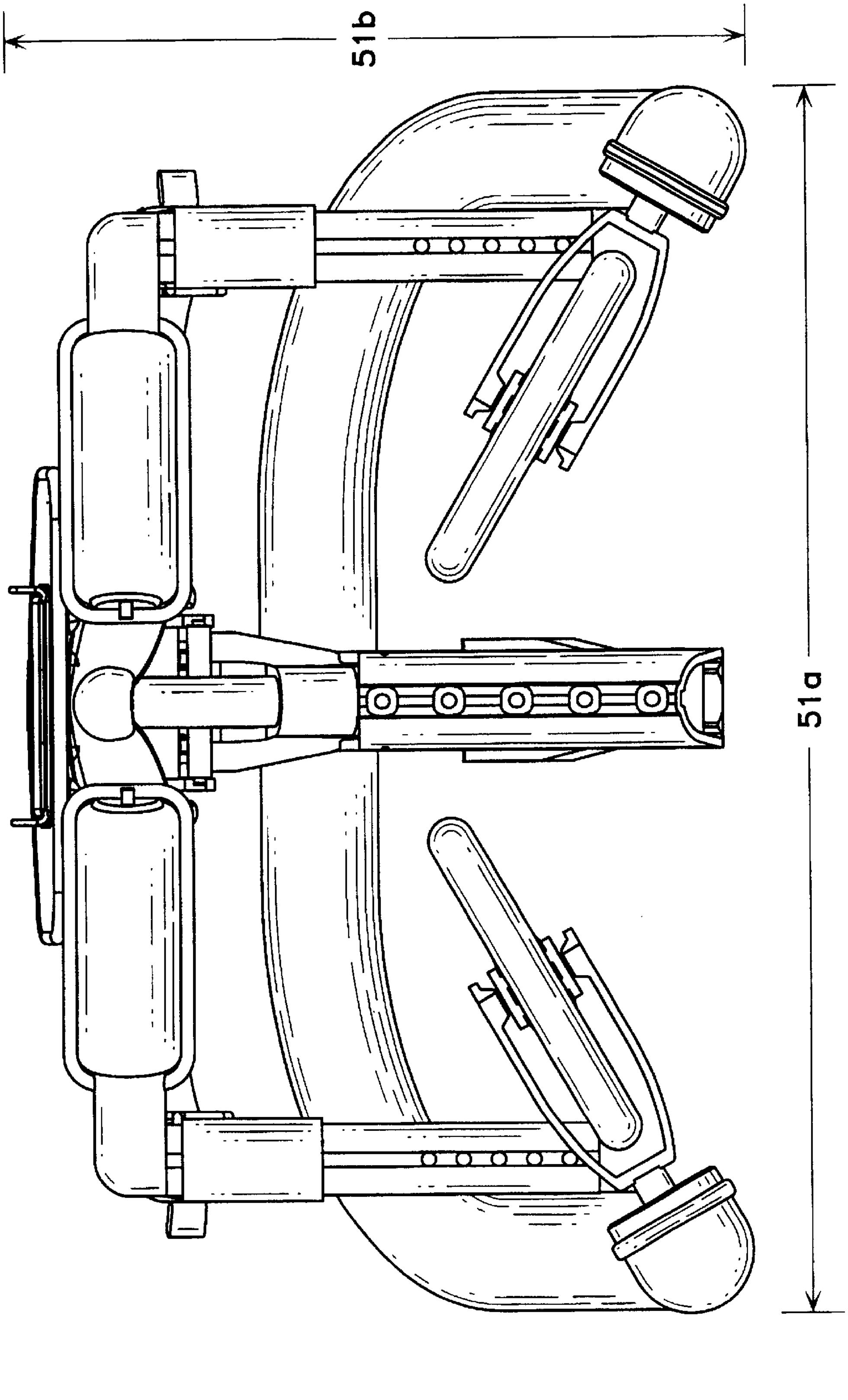
FIG. 10 shows the rotatable elements in a similar retracted position as in FIG. 9 within the envelope of the frame.

In the preferred embodiment, a plurality of rotatable element s (48) as shown in FIGS. 1 and 2(C) could be connected to the frame assembly. This could include being connected to the lower frame assembly (4) near the first lower frame element (22). These rotatable elements could include, for instance, wheels, casters, rollers, and other rotating devices. These rotatable elements generally could rotate about a horizontal axis (49) as shown in FIG. 2(C). Separately, they could turn or swivel about a second axis (50) which may be substantially perpendicular to a horizontal plane with respect to the lower frame assembly (4). Additional movement to the rotatable elements might include being designed to be folded to a substantially aligned planer position with respect to the horizontal plane to the lower frame assembly (4) when a frame wheel repositionable support (52) is rotated. This is shown in FIG. 9 where the wheels are aligned in a substantially planer position with respect to a horizontal plane near a lower frame assembly. While FIG. 9 shows the wheels aligned in a substantially planer position, the general intent of the folding of the rotatable elements (48) is to reduce the volume necessary to store or transport the device. Thus, as shown in FIG. 10, the rotatable elements may be folded to within an envelope of the frame. By the term "envelope", it is meant to include the volume created by approximately the outside dimensions of the frame assembly and, as shown in FIG. 10, could include the volume created by the horizontal frame envelope dimension (51$a$), the vertical frame envelope dimensions (51$b$), and the depth of the frame assembly.

Referring again to FIGS. 1 and 2(C), the rotatable elements may be folded to different orientations, typically within the envelope of the frame assembly. These may be folded using a frame wheel repositionable support (52). The frame wheel repositionable support may include a position retarding assembly (52$a$) which may assist in the folding by holding in a folded position. It may also include a retainer (52$c$) to retain the repositioning orientation, known to those in the art. For instance, to fold the rotatable elements (48) to a folded state, the user might depress the pin, which may be biased (such as with a spring) and act as a retainer (52$c$) by engaging a hole in the lower frame element (22), to release the frame wheel repositionable support (52) and rotate or otherwise reposition the frame wheel repositionable support to a folded position. Upon reuse, the frame wheel repositionable support may be rotated back to where the pin engages into position. (This feature is also described and shown in FIG. 11, below.) Naturally, other embodiments are possible that could allow the rotatable elements to be folded to a position within the envelope of the frame assembly.

If the rotatable elements are included with the embodiment, then a braking assembly (53) may be appropriate. The braking assembly (53) may include a remote braking actuator (53$a$), a master cylinder (53$b$), conduit lines (53$c$), a piston assembly (53$d$), a cylinder (53$g$) inside the rotatable element swivel axle (53$e$), and a brake shoe (53$f$). The braking assembly may be fluidicly actuated in that it may use a fluid (either a gas or a liquid, as would be know to those in the art) to remotely actuate the brake to engage the rotatable element. This type of braking assembly is in contrast to other devices in this field which typically may use a lever mounted to the rotatable element itself that requires manual actuation of each brake on each rotatable element so that the lever itself drags the rolling surface of a wheel. It is also in contrast to some devices which may use a variety of pulleys and cables to actuate the brakes. The present braking assembly may brake the rotatable elements fluidicly, may brake the rotatable elements in any direction in which the rotatable elements have turned about the second axis (50), and may brake a plurality of rotatable elements simultaneously. Furthermore, the braking assembly of the present invention may be advantaged in a mechanical or fluidic manner to provide an increased force in actuating the braking assembly. For instance, this could be useful for handicapped individuals needing assistance to actuate the braking assembly with a larger degree of force than their capabilities.

Another advantage of the braking assembly as part of the present invention is that a single station could brake a plurality of rotatably elements or the braking could include a multiple of stations acting on different rotatable elements. Likewise, because the braking assembly is fluidicly actuated, it may be placed at a variety of convenient locations for the user or an assistant. In the present invention, the remote braking actuator (53$a$) may be located on the lower frame assembly (4). Such a location could allow the user or an assistant to step on the actuator (53$a$) and fluidicly brake, in the embodiment shown, each of the rotatable elements simultaneously and omni-directionally (that is in any direction to which the rotatable elements are turned or swiveled). Naturally, it may be desirable to only brake a plurality of rotatable elements less than the total number of the rotatable elements or even a single rotatable element. Similarly, the remote braking actuator could be located in a position where the user's arms or hands could actuate the braking assembly. The master cylinder (53$b$) may be actuated by the remote braking actuator such that fluid pressure in the conduit lines (53$c$) actuates the piston (53$d$) at least rotatable element which may be enclosed in a cylinder (53$g$), which may in turn be located inside the rotatable element swivel axle (53$e$), although it may be located other places as well. Such actuation may force the brake shoe (53$f$) against the rotatable element, causing friction, thus producing a braking function.

Other embodiments of braking assemblies are certainly possible and may be included in the scope of the fluidicly actuating braking assembly described above. Such alternate embodiments could include disk brakes, either single or double acting cylinders, and other friction causing devices to cause restricted movement of the rotatable elements. Another aspect of the braking assembly as described above is that it may function in any position of the rotatable elements, even in a folded position, such as when the rotatable elements are folded within the envelope of the frame assembly.

In addition to the braking assembly, the present invention may include a rotatable swivel lock system. The rotatable swivel lock system (54) may include swivel actuator (54$a$), master cylinder (54$b$), conduit lines (54$c$), swivel cylinder (54$d$), swivel piston (54$e$), wrench (54$f$), pivot point (54$g$), and rotatable element swivel axle (53$e$), as shown in FIGS. 1 and 2(A). The swivel actuator (54$a$) may be similar to the remote braking actuator (53$a$). In the present invention, it may be positioned on the lower frame assembly (4) and may be actuated by a foot of a user or assistant and may be remote. The swivel actuator (54$a$) may actuate the master cylinder (54$b$) which in turn may pressurize the conduit line (54$c$) with fluid (either gas or liquid). The fluid may actuate the swivel cylinder (54$d$) which may include forcing the swivel piston (54$e$) to a position that may then move the wrench (54$f$). The wrench (54$f$) as shown in the present invention may pivot about pivot point (54$g$). Near the opposite end of the pivot point (54$g$), the wrench may move up and down on the rotatable element swivel axle (53$e$) from the perspective of FIG. 2. The rotatable element swivel axle (53$e$) in the present embodiment may have at least one swivel cam (54$h$), such as a non-circular flat, which the wrench may engage at different elevations. In the present embodiment, if the wrench, for instance, is in a no-engaging position (54$i$), the rotatable elements may turn about the axis (50) on the rotatable element swivel axle (53$e$). However, if the swivel actuator (54$a$) is actuated, the swivel piston (54$e$) may move the wrench (54$f$) in contact with the swivel cam (54$h$) on the rotatable element swivel axle (53$e$) as to reduce or prevent rotation. As shown in FIG. 2(C), in viewing multiple cams about the rotatable element swivel axle (53$e$), the wrench may prevent rotation at multiple angles about the second axis (50) as the frame wheel axle assembly (55) turns about the second axis (50). Also, similar to the braking system, the swivel lock system may include a station or a plurality of stations. A swivel lock system may be useful to the user when navigating side sloping surfaces or early stages of gait training.

The device may even be provided with a system that will allow the rotatable elements to be locked in place whenever it is folded to a position within the envelope of the frame assembly. Likewise, the present invention may use the cam (54*i*) and include a logic system that swivel locks each rotatable elements or any number of the rotatable elements automatically when the rotatable elements are folded, such as when folded within the frame envelope, regardless of whether the swivel actuator is actuated. As those with knowledge in the art would understand, an accumulator may be desired in each of the fluidic systems in order to better accomplish this and may be useful for adding fluid capacity to the fluidic systems.

Figure 11:
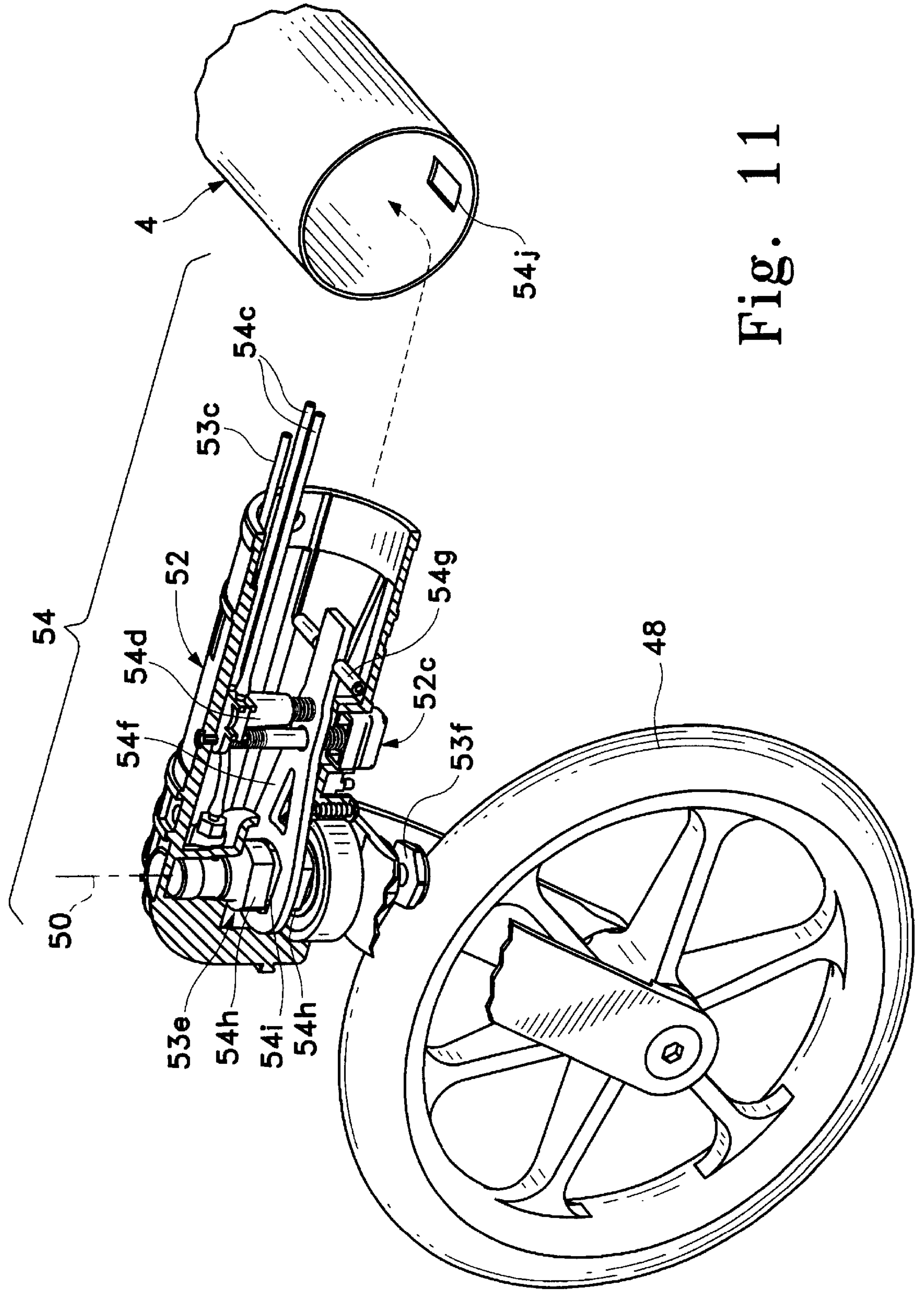
FIG. 11 shows an assembled view of fluidic conduit lines attached to the rotatable elements to control the swiveling and braking.

FIG. 11 shows some assembled items within the frame wheel repositionable support (52) described above, such as portions of the braking assembly (53), swivel lock system (54), retainer (52*c*), and a rotatable element (48). (To view the inside volume of the frame wheel repositionable support (52) for purposes of illustration, it is turned approximately 90 degrees from the actual orientation that it would engage the lower frame assembly (4).) conduit lines (53*c* and 54*c*) are shown as part of the braking assembly and swivel lock system. The conduit line (53*c*) could actuate the brake shoe (53*f*) toward the rotatable element (48) to brake against rotation. An isometric view of the wrench (54*f*) is also shown, whereupon the wrench extends toward the swivel cam (54*h*), shown in FIG. 2(A). As described above, the rotatable element swivel axle (53*e*) in the present embodiment may have at least one swivel cam (54*h*), with two being shown, which the wrench may engage at different elevations. In the present embodiment, if the wrench, for instance, is in a non-engaging position (54*i*), the rotatable elements may turn about the axis (50) on the rotatable element swivel axle (53*e*). However, if the swivel actuator (54*a*) is actuated, the swivel piston inside the swivel cylinder (54*d*) may move the wrench (54*f*), such as by causing it to pivot about pivot point (54*g*), in such contact with the swivel cam (54*h*) on the rotatable element swivel axle (53*e*) as to reduce or prevent rotation. Also shown is a portion of the retainer (52*c*) extending below the frame wheel repositionable support (52). The retainer (52*c*) could engage the hole (54*j*) (or other aperture) on the lower frame assembly (4) to restrain the frame wheel repositionable support (52) from rotating about the frame assembly (4) until disengaged, as described above.

When using the preferred embodiment of the present invention, a step may include providing the frame assembly to a user. The user or assistant might then position the user's pelvis near a vertical pelvis support element. By moving at least one horizontal pelvis support element connected to a frame assembly, the user may have access to the vertical pelvis support element. The user's pelvis might be positioned so that it is supported by the vertical pelvis support element. Horizontally, the pelvis may be supported primarily in a frontal plane at the anterior superior iliac spine of the pelvis with a horizontal pelvis support element. This may involve locating the horizontal pelvis support element against the pelvis. Another aspect of the present invention may include forcibly elevating the upper frame assembly to a comfortable height for the user or to another appropriate height that the user or the user's assistant may direct. To more fully utilize the present invention, the support may be such that it allows a full striding gait while accomplishing the support. Furthermore, in supporting the pelvis, the invention may advantage the horizontal pelvis support element or the vertical pelvis support element with a mechanically or fluidicly advantaged system. It may also be useful to provide rotatable elements that may be individually or collectively braked, restricted from swiveling upon actuation, or other restricted movements of the rotatable elements.

Another advantage of the present invention may be seen in providing a reduced, folded state of the device for increased capabilities for transportation and storage. Generally, the various adjustable elements, such as the horizontal pelvis support element, could be lowered to a minimal position in the upper frame assembly (6). The upper frame assembly (6) might be lowered by using the elevation element (5) to a lower elevation corresponding to an elevation of the lower frame assembly (4). This could include reducing the overall fully extended height by at least 30 percent. It could even include lowering the upper frame assembly so that it was substantially at a similar elevation with the lower frame assembly. This elevation could include, for instance, an elevation such that the majority of the upper frame assembly was within a few inches of the highest point of the lower frame assembly. For the preferred embodiment, the upper frame assembly could be designed to lower within the lower frame assembly envelope (such as between the side-to-side dimensions of the lower frame assembly) to better effectuate the folding, as shown in FIGS. 9 and 10. Furthermore, if the embodiment is provided with rotatable elements, the rotatable elements could be folded within the envelope created by the volume of the frame assembly (1). The device could then be more easily carried, transported, or stored.

Each of these support assistive embodiments could include various facets of the present invention. Some may include rotatable elements, while others may not include such elements. Some may include varieties of elevation adjustments specific to the elevation assembly or to the pelvis support elements. The market place and manufacturing concerns may dictate the appropriate embodiments for the present invention.

The foregoing discussion and the claims that follow describe only the preferred embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention.

It is simply not practical to describe in the claims all the possible embodiments to the present invention which may be accomplished generally in keeping with the goals and objects of the present invention and this disclosure and which may include separately or collectively such aspects as supporting the pelvis in specific areas such as the anterior superior iliac spine and ischial tuberosities, the fluidicly actuated braking assembly system, the multiple actuation tabs directly and independently actuating a forcing element, and other aspects of the present invention. While these may be added to explicitly include such details, the existing claims should be construed to encompass such aspects. To the extent the methods claimed in the present invention are not further discussed, they are natural outgrowths of the system or apparatus claims. Therefore, separate and further discussion of the methods are deemed unnecessary as they otherwise claim steps that are implicit in the use and manufacture of the system or the apparatus claims. Furthermore, the steps are organized in a more logical fashion, however, other sequences can and do occur. Therefore, the method claims should not be construed to include only the order of the sequence and steps presented.

What is claimed is:

1. A method of supporting a user having a pelvis in a support assistive walking device comprising:

a. positioning said pelvis near a rigid and positive anterior superior iliac spine horizontal pelvis support in the vicinity of a front of said support assistive walking device;

b. biasing said pelvis toward said horizontal pelvis support;

c. vertically supporting said pelvis primarily on at least one ischial tuberosity of said pelvis with a vertical pelvis support element;

d. simultaneously and concentratedly anterior superior iliac spine supporting said pelvis in a horizontal direction above said vertical support element; and e. providing mobility to said user by a plurality of rotatable elements connected to said support assistive walking device.

2. A method of supporting said user in said support assistive walking device as described in claim 1 wherein said step of simultaneously and concentratedly anterior superior iliac spine supporting said pelvis comprises the step of supporting primarily a left and right anterior superior iliac spine.

3. A method of supporting said user in said support assistive walking device as described in claim 1 comprising the step of allowing a full striding gait while horizontally supporting said pelvis.

4. A method of supporting said user in said support assistive walking device as described in claim 1 further comprising the step of supporting said pelvis substantially independently of at least one arm of said user.

5. A method of supporting said user in said support assistive walking device as described in claim 1 wherein said step of vertically supporting said pelvis and said step of simultaneously and concentratedly anterior superior iliac spine supporting said pelvis comprises the step of allowing elevation adjustments.

6. A method of supporting said user in said support assistive walking device as described in claim 1 wherein step of biasing said pelvis comprises the step of biasing said pelvis toward a anterior superior iliac spine with a first restraining element.

7. A method of supporting said user in said support assistive walking device as described in claim 1 comprising the step of flexibly allowing said rotatable elements to rotate about a first axis substantially parallel to a horizontal plane with respect to a frame assembly while allowing said rotatable elements to separately turn about a second axis substantially perpendicular to a horizontal plane with respect to said frame assembly.

8. A method of supporting said user in said support assistive walking device as described in claim 7 further comprising the step of allowing said rotatable elements to be swivel locked into a plurality of positions about said second axis.

9. A method of supporting a user having a pelvis in a support assistive walking device as described in claim 8 wherein said step of allowing said rotatable elements to be swivel locked further comprises the step of allowing said swivel locking from a single station.

10. A method of supporting said user in said support assistive walking device as described in claim 7 further comprising the step of braking said support assistive walking device with a braking assembly.

11. A method of supporting said user in said support assistive walking device as described in claim 10 wherein said step of braking further comprises the step of fluidicly actuating said braking assembly.

12. A method of supporting said user in said support assistive walking device as described in claim 10 or 11 wherein said step of braking comprises the step of advantaging said braking assembly.

13. A method of supporting said user in said support assistive walking device as described in claim 10 wherein said step of braking comprises the step of braking a plurality of rotatable elements from a single station.

14. A method of supporting said user in said support assistive walking device as described in claim 10 or 13 wherein said step of braking comprises the step of braking omni-directionally.

15. A method of supporting said user in said support assistive walking device as described in claim 14 wherein said step of braking omni-directionally comprises the step of braking simultaneously a plurality of said rotatable elements.

16. A method of supporting said user in said support assistive walking device as described in claim 7 further comprising allowing said rotatable elements to be folded to a substantially aligned planar position with respect to said horizontal plane on said frame assembly.

17. A support assistive walking device for a user having a pelvis with an anterior superior iliac spine comprising:

a. a frame assembly having a front and a back;

b. an ischial tuberosity vertical pelvis support element connected to said frame assembly adapted to engage said user;

c. a rigid and positive anterior superior iliac spine horizontal pelvis support element connected to said frame assembly in the vicinity of said front to engage said user simultaneous with said ischial tuberosity vertical pelvis support element wherein said horizontal pelvis support element is adapted to support said user above said ischial tuberosity vertical pelvis support element; and d. a plurality of rotatable elements connected to said frame assembly which provide mobility.

18. A support assistive walking device for a user having a pelvis with an anterior superior iliac spine as described in claim 17 wherein said horizontal pelvis support element comprises an anterior superior iliac spine left support element and an anterior superior iliac spine right support element.

19. A support assistive walking device as described in claim 18 wherein said horizontal pelvis support element is horizontally adjustable relative to said vertical pelvis support element.

20. A support assistive walking device as described in claim 19 wherein said horizontal pelvis support element is vertically adjustable relative to said vertical pelvis support element.

21. A support assistive walking device for a user having a pelvis with an anterior superior iliac spine as described in claim 17 further comprising a pelvis biasing element attached to said horizontal pelvis support element.

22. A support assistive walking device for a user having a pelvis with an anterior superior iliac spine as described in claim 17 wherein said vertical pelvis support element and said horizontal pelvis support element are adapted to support a full striding gait.

23. A support assistive walking device for a user having a pelvis with an anterior superior iliac spine as described in claim 17 wherein said vertical pelvis support element and said horizontal pelvis support element are interactively adapted to allow a full striding gait independent of the substantial use of arms for support.

24. A support assistive walking device for a user having a pelvis with an anterior superior iliac spine as described in claim 17 or 18 wherein said horizontal pelvis support element comprises a horizontal pelvis securing element connected to said horizontal pelvis support element to secure said horizontal pelvis support element.

25. A support assistive walking device for a user having a pelvis with an anterior superior iliac spine as described in claim 24 wherein said horizontal pelvis securing element further comprises a left securing element and a right securing element wherein said left and right securing elements act independently of each other.

26. A support assistive walking device for a user having a pelvis with an anterior superior iliac spine as described in claim 17 further comprising a braking assembly.

27. A support assistive walking device for a user having a pelvis with an anterior superior iliac spine as described in claim 26 wherein said barking assembly is fluidicly actuated.

28. A support assistive walking device for a user having a pelvis with an anterior superior iliac spine as described in claim 27 wherein said braking assembly further comprises a remote braking actuator attached to said braking assembly for remotely actuating said braking assembly to brake a plurality of said rotatable elements.

29. A support assistive walking device for a user having a pelvis with an anterior superior iliac spine as described in claim 27 or 28 wherein said braking assembly is leveraged.

30. A support assistive walking device for a user having a pelvis with an anterior superior iliac spine as described in claim 28 wherein said remote braking actuator element further comprises a single station and wherein said single station brakes a plurality of said rotatable elements.

31. A support assistive walking device for a user having a pelvis with an anterior superior iliac spine as described in claim 29 further comprising a single station attached to said frame wherein said single station brakes a plurality of said rotatable elements.

32. A support assistive walking device for a user having a pelvis with an anterior superior iliac spine as described in claim 26 wherein said braking assembly omni-directionally brakes a plurality of said rotatable elements.

33. A support assistive walking device for a user having a pelvis with an anterior superior iliac spine as described in claim 32 wherein said braking assembly brakes simultaneously a plurality of said rotatable elements.

34. A support assistive walking device for a user having a pelvis with an anterior superior iliac spine as described in claim 17 wherein said frame assembly comprises a lower frame assembly and a upper frame assembly and an elevation assembly connected between said lower and upper frame assemblies and wherein said elevation assembly allows changing an elevation of said upper frame assembly to a corresponding elevation with said lower frame assembly.

35. A support assistive walking device for a user having a pelvis with an anterior superior iliac spine as described in claim 34 wherein said elevation assembly further comprises a forcing element to assist said user in said changing of said elevation.

36. A support assistive walking device as described in claim 34 or 35 wherein said elevation assembly is able to be directly and independently activated from a plurality of independent locations.

37. A support assistive walking device for a user having a pelvis with an anterior superior iliac spine as described in claim 17 or 34 wherein said rotatable elements are able to be folded substantially within an envelope of said frame assembly.

38. A support assistive walking device for a user having a pelvis with an anterior superior iliac spine as described in claim 17 wherein said rotatable elements are able to rotate about a horizontal first axis and separately turn about a second axis substantially perpendicular to a horizontal plane with respect to said frame assembly.

39. A support assistive walking device for a user having a pelvis with an anterior superior iliac spine as described in claim 38 wherein said rotatable elements are adapted to be automatically swivel locked into a position when said rotatable elements are folded to a substantially aligned planar position with respect to said horizontal plane on said frame assembly.

40. A support assistive walking device for a user having a pelvis with an anterior superior iliac spine as described in claim 38 wherein said rotatable elements are able to be folded to a substantially aligned planar position with respect to said horizontal plane on said frame assembly.

41. A support assistive walking device for a user having a pelvis with an anterior superior iliac spine as described in claim 38 wherein said rotatable elements are able to be swivel locked into a position about said second axis.

42. A support assistive walking device for a user having a pelvis with an anterior superior iliac spine as described in claim 41 further comprising a single station to swivel lock a plurality of said rotatable elements.

43. A support assistive walking device for a user having a pelvis with an anterior superior iliac spine comprising:

a. a lower frame assembly b. an elevation assembly connected to said lower frame assembly; and c. an upper frame assembly having a front and a back, having an adjustable height and
connected to said elevation assembly comprising:
 i. an ischial tuberosity vertical pelvis support element connected to said frame assembly adapted to engage said user; and
 ii. a rigid and positive anterior superior iliac spine horizontal pelvis support element connected to said frame assembly in the vicinity of said front to engage said user simultaneous with said ischial tuberosity vertical pelvis support element wherein said horizontal pelvis support element is adapted to support said user above said ischial tuberosity vertical pelvis support element; and b. a plurality of rotatable elements connected to said frame assembly which provide mobility.

44. A support assistive walking device for a user having a pelvis with an anterior superior iliac spine comprising:

a. a frame assembly having a front and a back, said frame assembly comprising:
 i. a lower frame assembly;
 ii. a lowerable upper frame assembly comprising an ischial tuberosity vertical pelvis support element connected to said lowerable upper frame assembly adapted to engage said user and a rigid and positive anterior superior iliac spine horizontal pelvis support element connected to said lowerable upper frame assembly in the vicinity of said front to engage said user simultaneous with said ischial tuberosity vertical pelvis support element wherein said horizontal pelvis support element is adapted to support said user above said ischial tuberosity vertical pelvis support element;

b. an elevation assembly connecting said upper frame assembly to said lower frame assembly wherein said elevation assembly is able to allow said upper frame assembly to vertically change elevation to a corresponding elevation with said lower frame assembly and to maintain the upper frame assembly in a substantially constant pelvic orientation as said upper frame assembly changes elevation; and c. a plurality of rotatable elements connected to said frame assembly which provide mobility.

45. A support assistive walking device as described in claim 44 comprising a frame wheel repositionable support connecting at least one of said plurality of rotatable elements to said lower frame assembly wherein said frame wheel repositionable support is adapted to allow at least one of said rotatable elements to be folded substantially within an envelope of said frame assembly.

46. A support assistive walking device as described in claim 44 wherein said elevation assembly is adapted to maintain said upper frame assembly in a substantially level orientation at a variety of elevations.

47. A support assistive walking device as described in claim 44 wherein said elevation assembly is adapted to be directly and independently activated from a plurality of independent locations.

* * * * *